Aug. 16, 1938.  F. W. SEYBOLD  2,127,432
PAPER CUTTING MACHINE
Filed Nov. 7, 1936  10 Sheets-Sheet 1
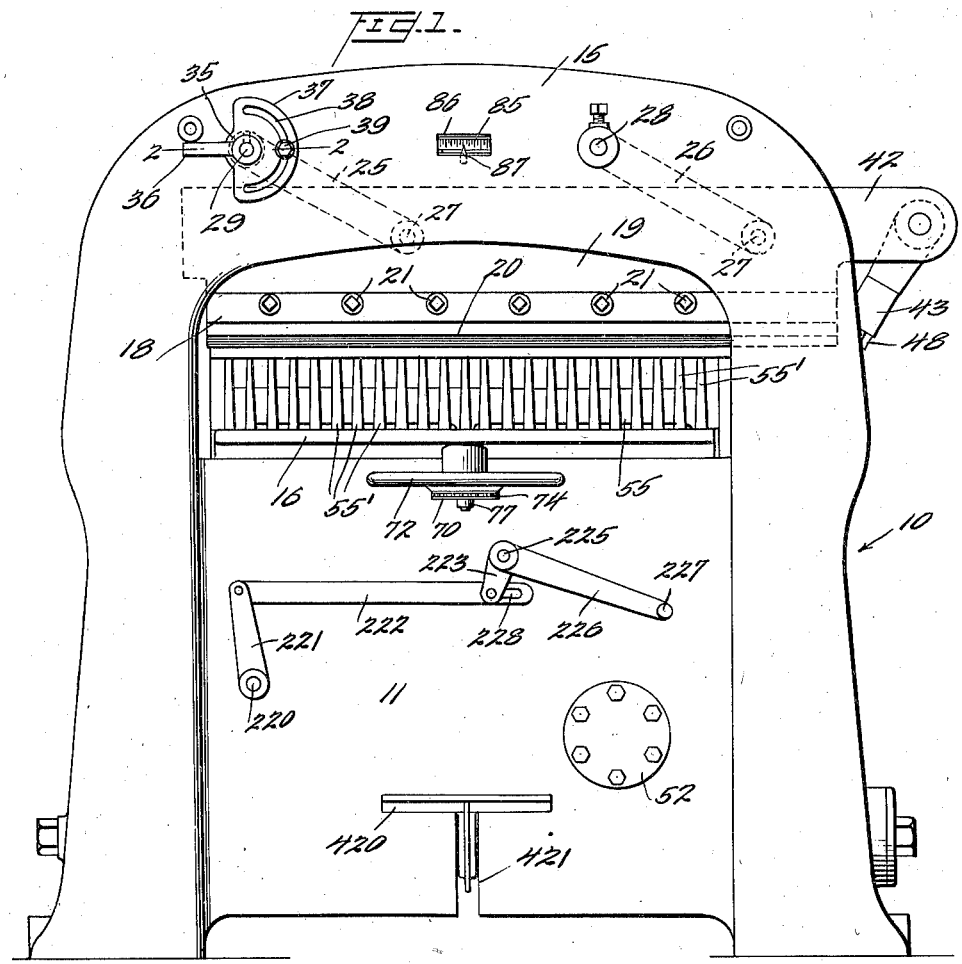
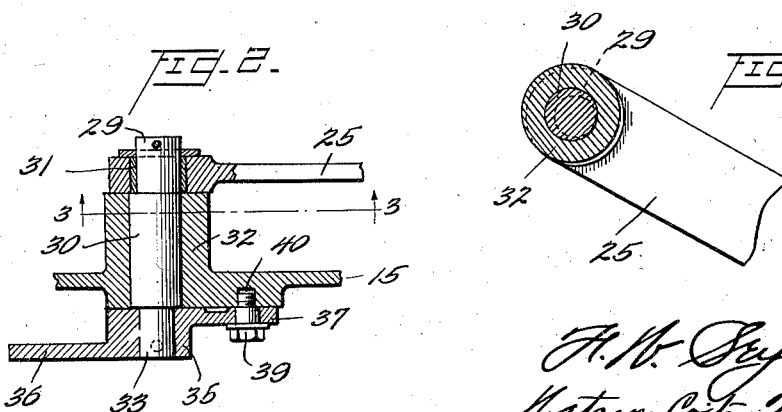
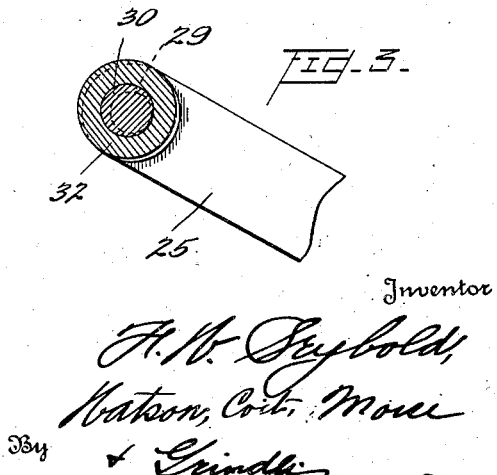

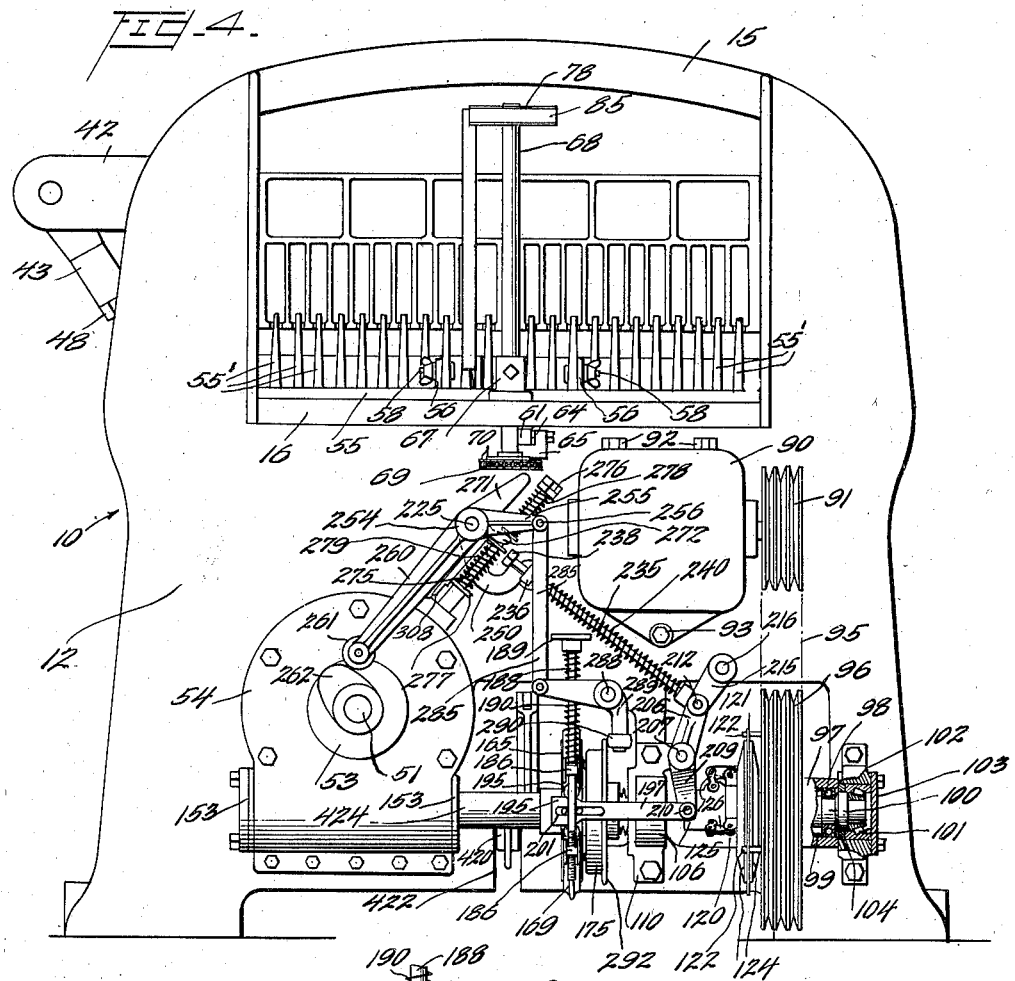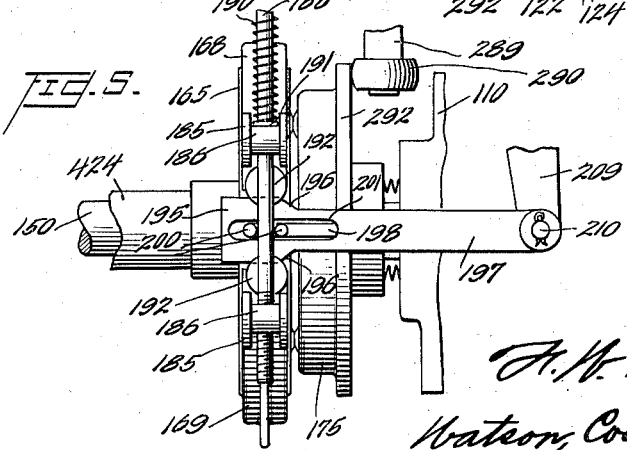

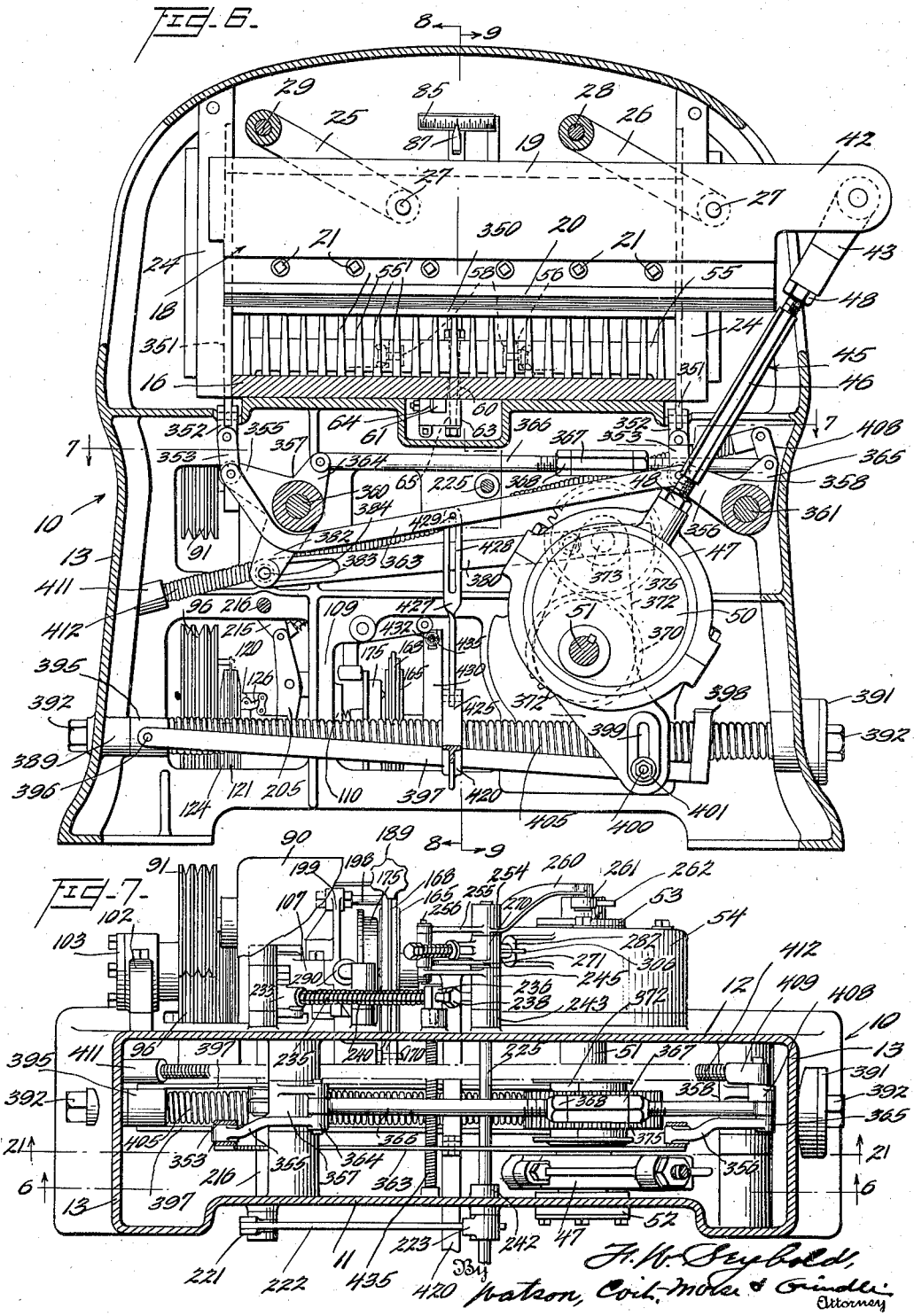

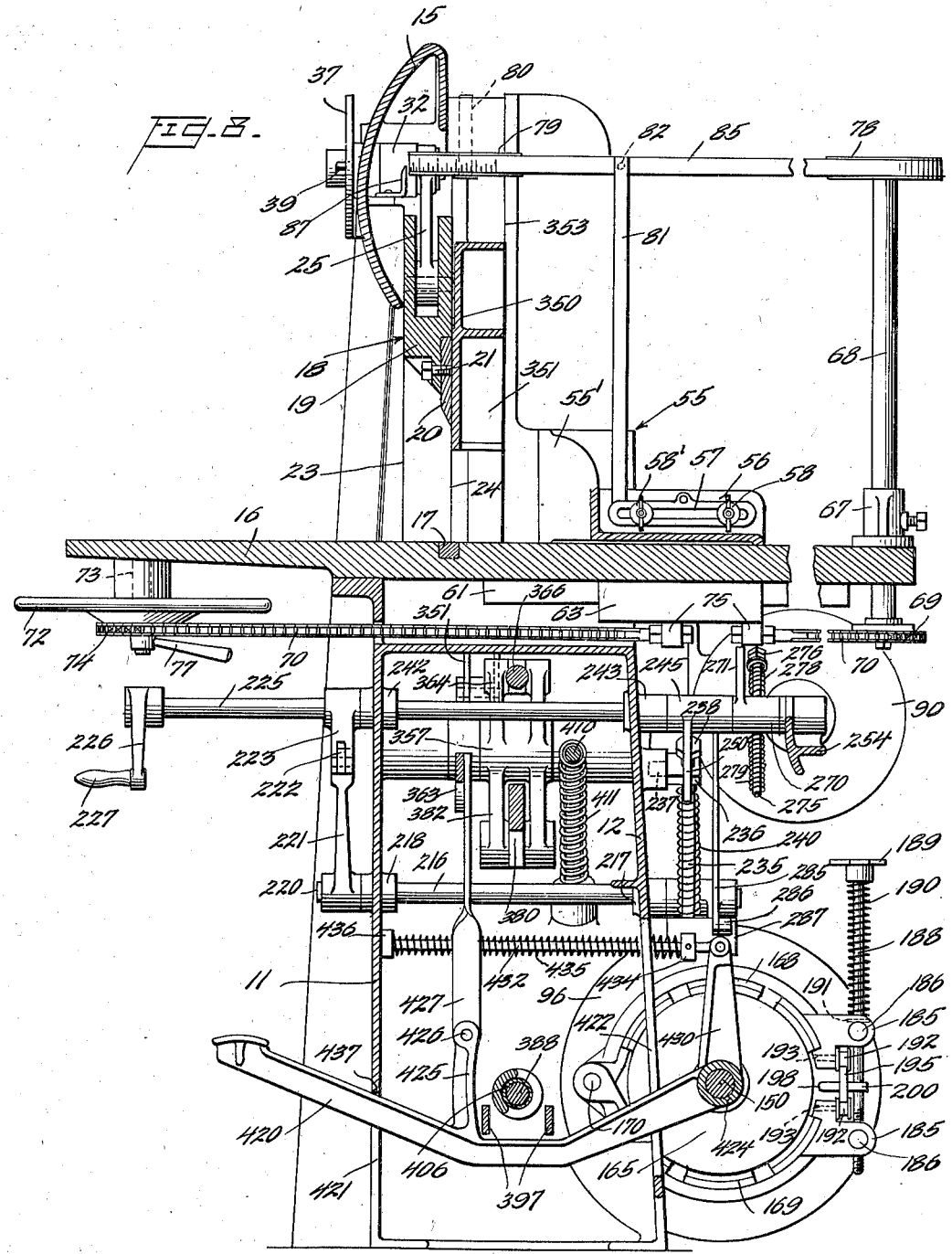

Aug. 16, 1938.   F. W. SEYBOLD   2,127,432
PAPER CUTTING MACHINE
Filed Nov. 7, 1936   10 Sheets-Sheet 5
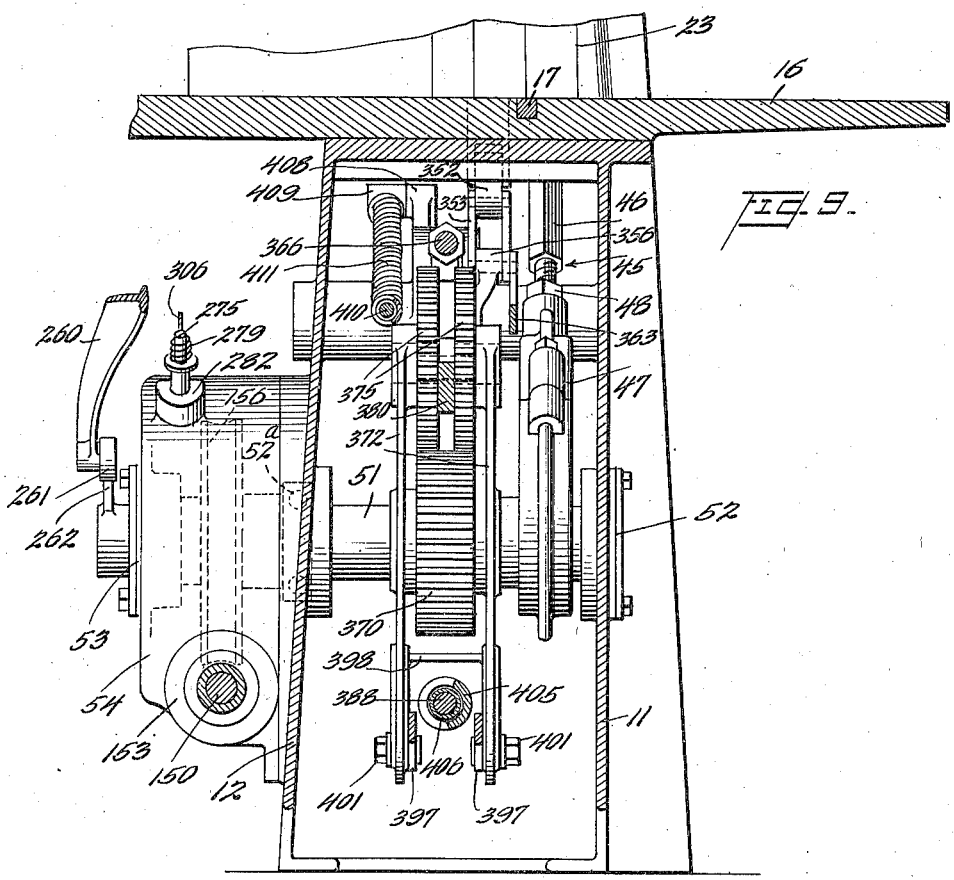
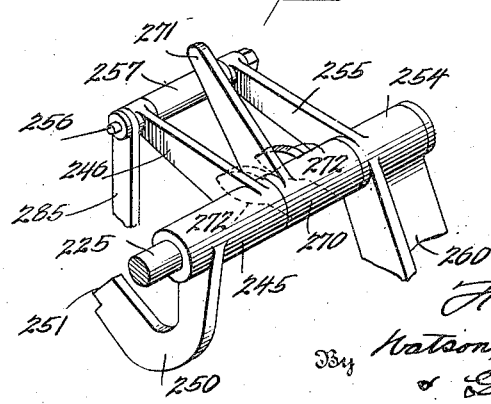
Inventor
F. W. Seybold,
By Watson, Coit, Morse
& Grindle
Attorney

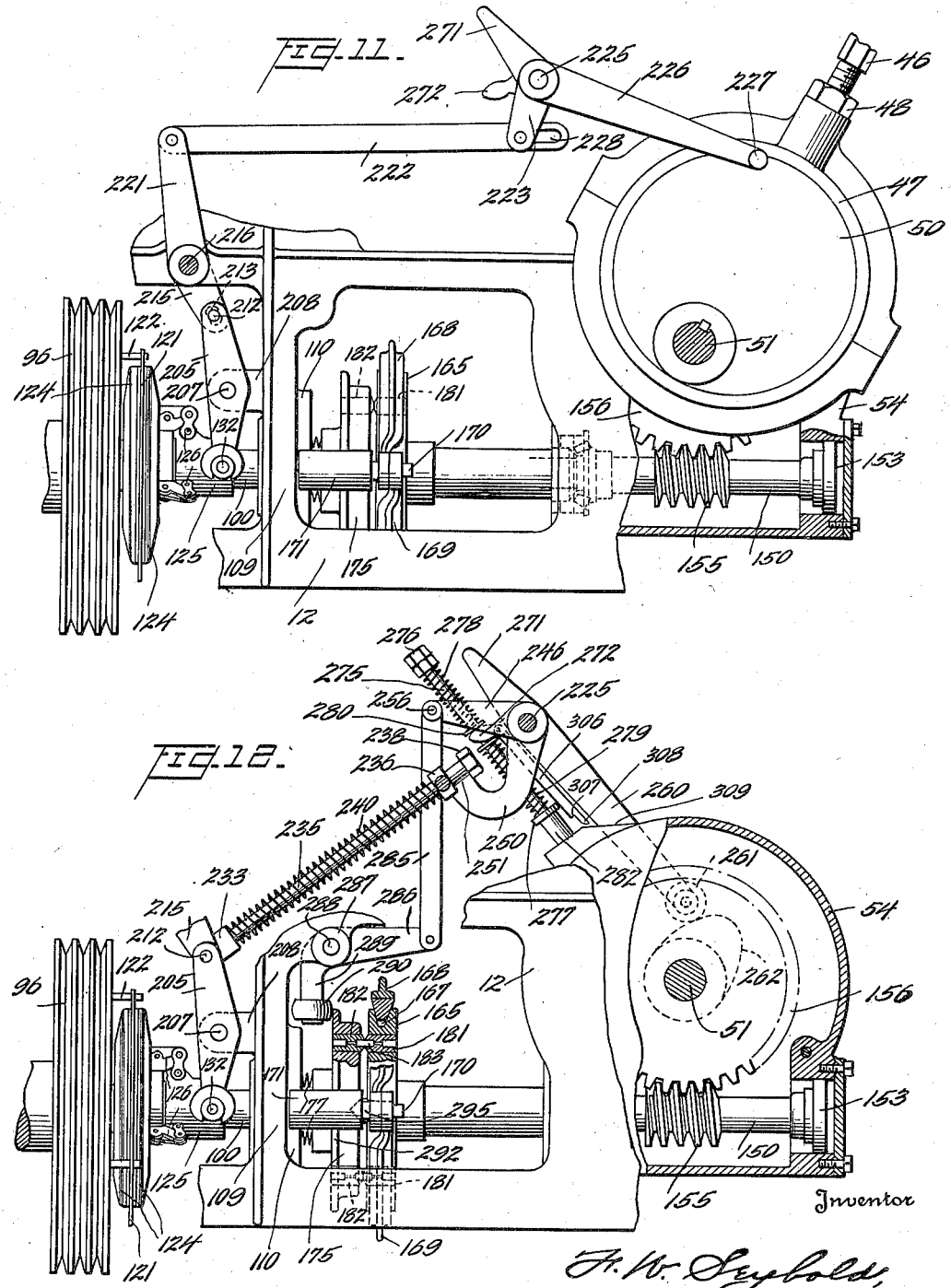

Aug. 16, 1938.  F. W. SEYBOLD  2,127,432
PAPER CUTTING MACHINE
Filed Nov. 7, 1936  10 Sheets-Sheet 7
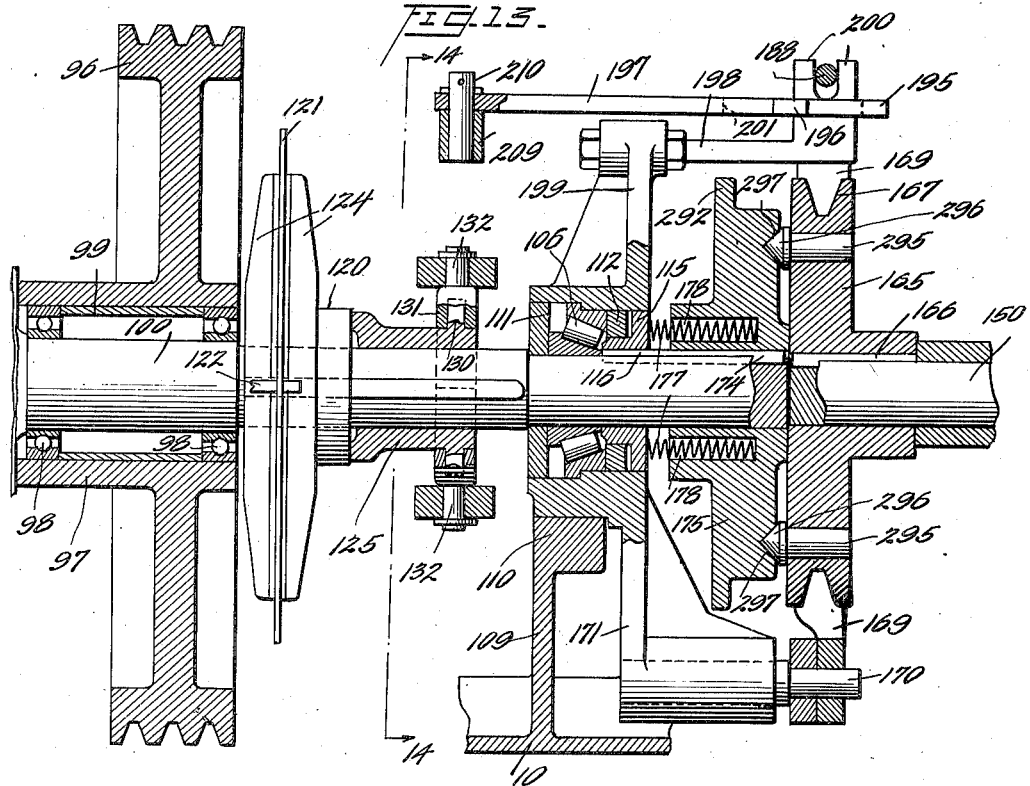
Inventor
F. W. Seybold,
By Watson, Coit, Morse
& Grindle
Attorney Aug. 16, 1938.　　　F. W. SEYBOLD　　　2,127,432
PAPER CUTTING MACHINE
Filed Nov. 7, 1936　　　10 Sheets-Sheet 8
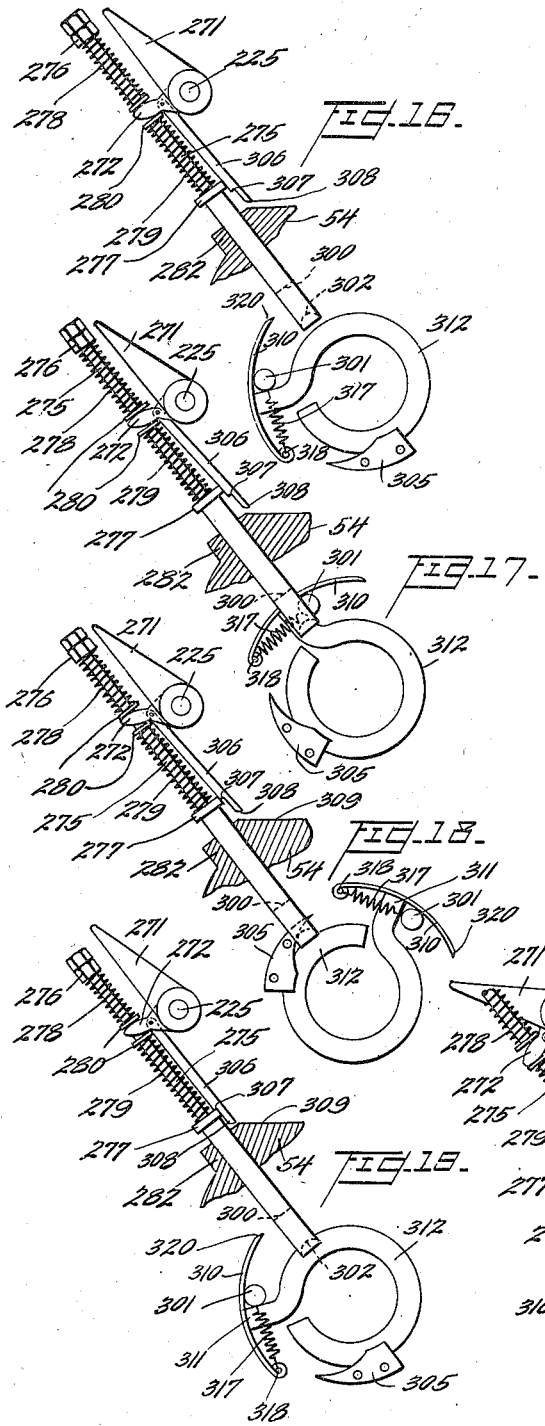
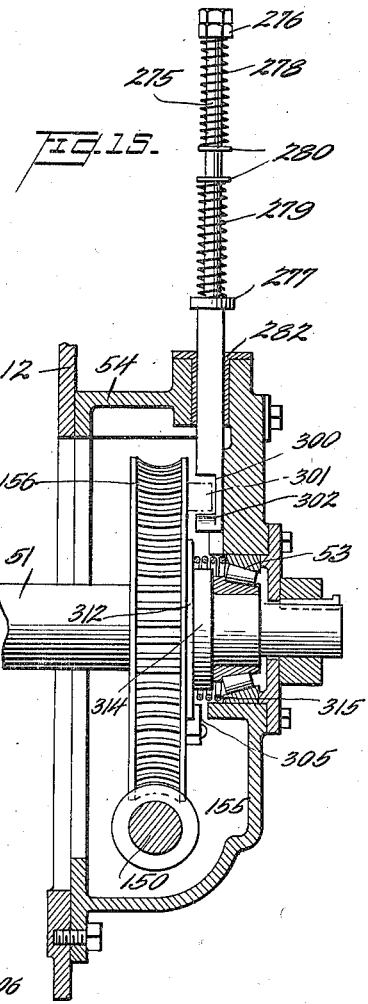
Inventor
F. W. Seybold
By Watson, Coit, Morse
& Grindle
Attorney Aug. 16, 1938.   F. W. SEYBOLD   2,127,432
PAPER CUTTING MACHINE
Filed Nov. 7, 1936   10 Sheets-Sheet 9
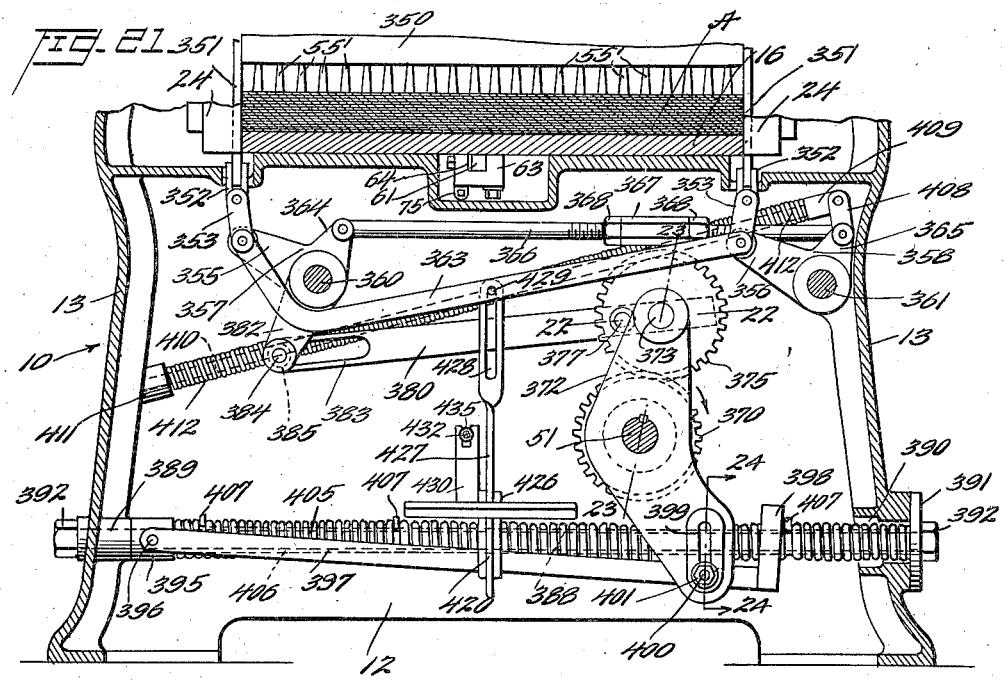
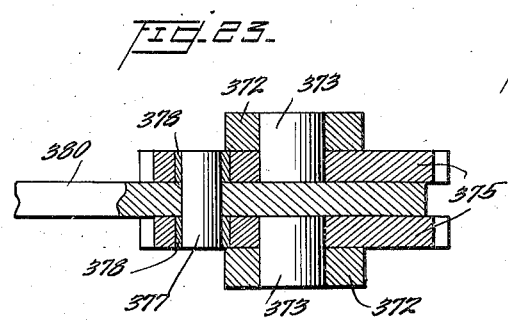
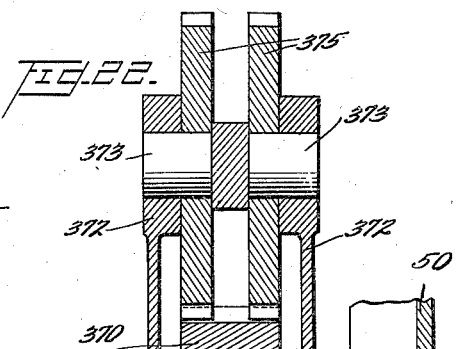
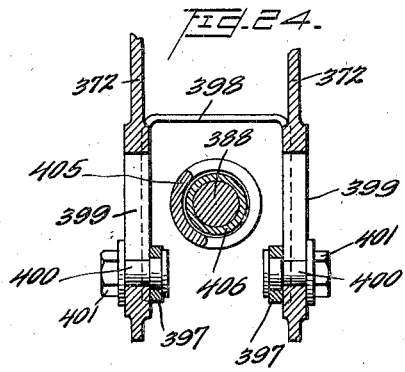

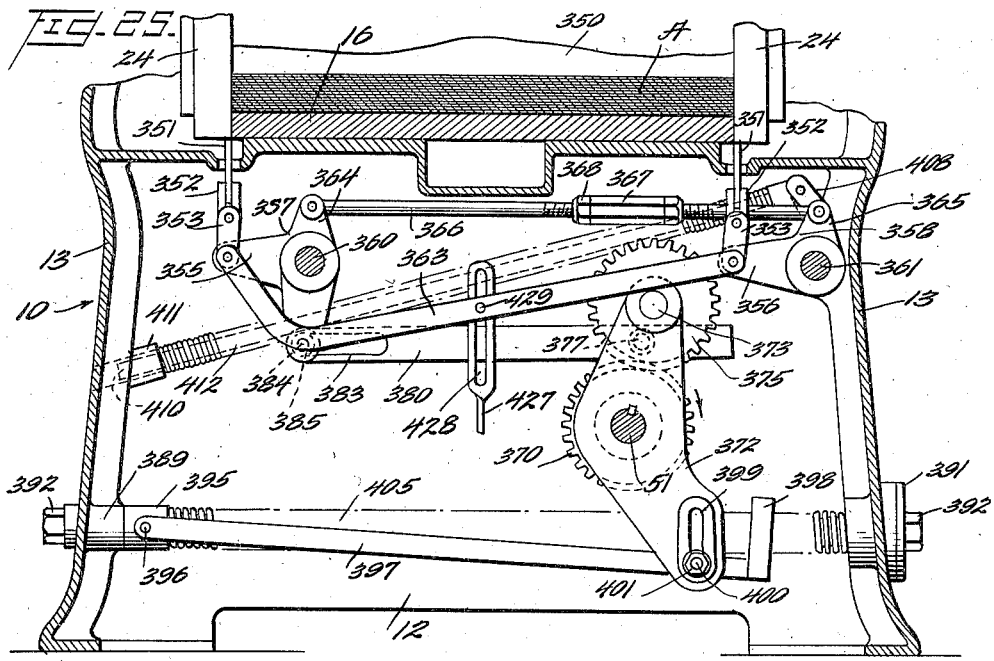
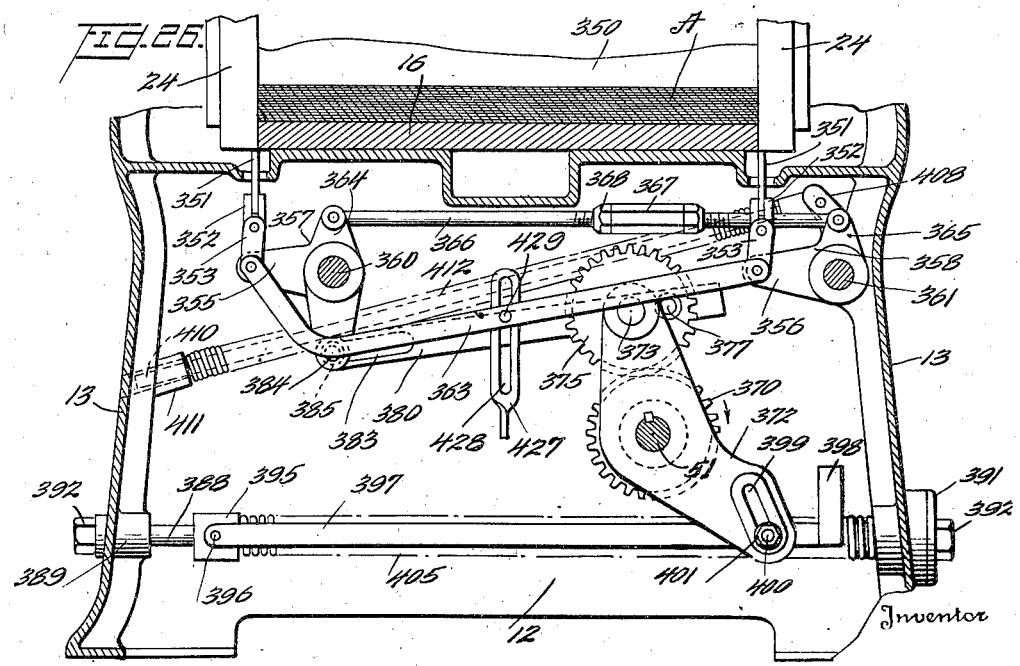

Patented Aug. 16, 1938

2,127,432

UNITED STATES PATENT OFFICE 2,127,432

PAPER CUTTING MACHINE

Frederick W. Seybold, Westfield, N. J., assignor to American Type Founders Incorporated, Elizabeth, N. J., a corporation of New Jersey Application November 7, 1936, Serial No. 109,795

46 Claims. (Cl. 164—54)

This invention relates to cutting machines and more particularly to paper cutting and trimming machines of the type employing a knife which is adapted to reciprocate or oscillate in a vertical plane.

The general object of the invention is to provide a novel and improved cutting machine of this character which is of a sturdy construction, powerful yet accurate in operation, and capable of a greater degree of control, in the interests of both efficiency and safety, than similar devices heretofore proposed.

Paper cutting devices of this general type are rugged and powerful motor driven machines, the larger ones being designed to cut or trim piles of paper one hundred or more inches wide and of thicknesses up to four or five inches. However, despite the weight and sturdiness of the knife and operating mechanism, it is important that the starting and stopping of the device be effected quickly and adapted for both manual and automatic control. There must also be provided means for automatically clamping the paper firmly during the cutting operation so that there shall be no shifting nor warping of the pile.

Furthermore, from the very nature of the device it is obvious that, in the absence of the provision of certain safety features, serious accidents might occur. These safety and protective devices should accomplish the purpose of preventing injury to the operator, to the stock, and to the machine and its driving and transmission mechanisms.

With these points in view, the more specific objects of the present invention include the provision of a novel starting mechanism for the cutter, and the provision of novel driving mechanism embodying non-repeating features which ensure that the knife will make only one cut even though the usual driving release mechanism fails to function or the manual starting device is deliberately held in operative position.

Another object of the invention is the provision of an overload protecting device which will prevent undue strain or breakage of the driving mechanism, if unusual resistance is encountered.

A further object of the invention is the provision of an automatic paper clamping mechanism which is adapted through the actuation of the cutter driving means to firmly clamp the pile of paper with the required pressure, which even in machines of moderate size may amount to several tons. The pressure of the clamping mechanism, furthermore, is automatically adjusted to the height of the pile of paper. Provision is also made for absorbing the preloading strain of the clamping mechanism so that the driving mechanism is relieved of the torque which might otherwise prove a source of danger to the operator.

Other objects and features of novelty will be apparent from the following specification when read in connection with the accompanying drawings in which one embodiment of the invention is illustrated by way of example.

In the drawings:

Figure 1 is a view in front elevation of a paper cutter embodying the principles of the invention;

Figure 2 is a fragmentary view in horizontal section on an enlarged scale showing a detail of the knife leveling support and taken substantially on line 2—2 of Figure 1;

Figure 3 is a fragmentary vertical sectional view taken on line 3—3 of Figure 2;

Figure 4 is a view of the cutter in rear elevation;

Figure 5 is a fragmentary view in rear elevation on an enlarged scale of certain details of mechanism shown in the lower portion of Figure 4;

Figure 6 is a vertical transverse sectional view taken just inside of the front wall of the machine or substantially on line 6—6 of Figure 7;

Figure 7 is a horizontal sectional view taken substantially on line 7—7 of Figure 6;

Figure 8 is a vertical longitudinal sectional view taken substantially on line 8—8 of Figure 6;

Figure 9 is a vertical longitudinal sectional view of the lower portion of the machine taken on line 9—9 of Figure 6;

Figure 10 is a fragmentary view in perspective on an enlarged scale of certain cranks and levers included in the safety mechanism controlling the operation of the cutter;

Figure 11 is a view in elevation on an enlarged scale of the principal portions of the starting and driving mechanism;

Figure 12 is a similar view illustrating certain of the safety devices embodied in the driving mechanism; certain portions of the devices being shown in vertical section;

Figure 13 is a view in horizontal section on a further enlarged scale of certain details of the safety driving mechanism;

Figure 14 is a view in vertical section of the clutch actuating levers, and taken substantially on line 14—14 of Figure 13;

Figure 15 is a view in vertical section through the gear box which is secured to the rear of the frame of the cutter;

Figures 16, 17, 18, 19, and 20 are somewhat diagrammatic views in vertical section showing various positions of operation of the non-repeating safety mechanism;

Figure 21 is a view in vertical transverse section through the lower portion of the frame of the cutter showing the automatic clamping mechanism and taken substantially on line 21—21 of Figure 7;

Figure 22 is a view in substantially vertical section taken on line 22—22 of Figure 21 and illustrating a detail of the clamp operating mechanism;

Figure 23 is a substantially horizontal sectional view taken on line 23—23 of Figure 21;

Figure 24 is a substantially vertical sectional view taken on line 24—24 of Figure 21; and Figures 25 and 26 are views similar to Figure 21 illustrating two successive stages in the actuation of the clamping mechanism.

Referring now more especially to the general views comprising Figures 1, 4, 6, and 8, it will be seen that the cutting machine comprises a main frame 10 which preferably is formed integrally by a single casting operation. This mode of construction ensures a greater degree of strength and rigidity than a frame fabricated of several assembled parts. The main frame 10 in the preferred embodiment is hollow so as to provide an enclosure for part of the operating mechanism and is provided with the front wall 11, the rear wall 12, and the side walls 13. The front wall 11 may be slightly depressed or inset centrally of the machine as shown, the side portions of the frame being extended upwardly beyond the central portion of the front wall 11 to provide an arched construction indicated at 15 over the central opening across which the knife 18 is adapted to swing and through which extends the table 16 upon which the paper to be cut is placed. This table is also arranged to carry certain gauging mechanism which will be described later and is also provided with a groove adapted to receive the wooden cutting stick 17 positioned immediately beneath the knife edge.

The knife

The vertically oscillating knife member designated generally by the reference numeral 18 comprises the heavy knife bar or carrier 19 and the knife blade 20 which is secured to the carrier as by means of the bolts 21. The knife 18 is guided at each side of the main frame 10 between the rearwardly facing surfaces 23 on the arch portion 15 of the main frame and the rearwardly disposed guide plates 24 which are secured to the main frame 10. The knife bar 19 is bifurcated or deeply slotted to receive the depending ends of the supporting links 25 and 26, the pins 27 being provided to pivotally connect the bar with the lower ends of the links. The link 26 is suspended from the pin 28 and the link 25 is suspended from the eccentric portion 29 of the pin 30 as most clearly shown in Figures 1, 2, and 3. A bushing 31 may be interposed between the link 25 and the eccentric portion of the pin 30, the main portion of the pin 30 being received in the bearing 32 provided in the upper arched portion 15 of the frame. Upon the forwardly projecting end 33 of the pin 30 there is secured a member 35 having a handle 36 and a semi-circular portion 37 provided with an arcuate slot 38 through which the screw 39 is adapted to pass. The screw 39 is threaded into the frame as at 40 and serves to clamp the member 35 rigidly in an adjusted angular position which determines the position of the eccentric pivot portion 29 of the pin 30 which supports the link 25 of the knife. By suitable adjustment of the member 35 by means of the handle 36 the knife may be leveled so that it will strike the wooden cutting stick 17 evenly. When the proper setting is made, the screw 39 is tightened in order to clamp the member 35 securely in the adjusted position against the face of the frame.

The right hand end 42 of the knife bar 19 as seen in Figures 1 and 6 is also bifurcated to receive the yoke 43 comprising the upper end of the pull rod 45 which is adapted to operate the knife. The intermediate portion of the pull rod 45 comprises the hexagonal turnbuckle section 46 which is provided with threads of opposite hand at each end for adjustable connection with the yoke 43 and with the eccentric strap 47 provided at the lower end of the rod. Once the desired length of the pull rod 45 is attained by rotation of the central portion 46, the adjustment may be locked by means of the nuts 48. The eccentric strap 47 is carried by the eccentric member 50 which is carried by the shaft 51 which extends longitudinally of the frame 10 and is rotatably mounted in the anti-friction bearing assemblies 52, 52a and 53, the last named one being disposed in the gear casing or housing 54 fastened to the lower part of the rear wall 12 of the main frame. The driving means for this shaft 51 will be described in detail hereinafter.

The gauging mechanism

In order to position the paper accurately upon the table 16 so that it may be cut to the proper size and to ensure that the edges are squared up perfectly, an adjustable back gauge 55 is provided, against the vertical fingers 55' of which the rear edge of the pile is placed. The back gauge is generally made in three sections so that the parts may be arranged in staggered relation in order to facilitate the cutting and trimming of certain classes of work such as tablets and other gang work. The three sections are provided with rearwardly directed flanges 56 which are slotted as at 57 for the reception of the thumb screw clamping bolts 58, by which they are secured together.

The table 16 is provided with a central longitudinally extending slot 60, and upon its underside with a tongue 61 lying adjacent the slot 60. A slotted guide member 63, provided with a gib 64, is slidably fitted upon the tongue 61. The central section of the back gauge 55 is securely fastened to the guide member 63 by means of the taper pin 65. At the extreme rear end of the table 16 there is provided a bracket 67 adapted to rotatably support the vertically extending post 68, upon the lower end of which is secured a sprocket wheel 69 about which the chain 70 is passed. Beneath the forward end of the table 16, the hand wheel 72 is mounted to turn upon the pin 73. A sprocket wheel 74 is carried by the hand wheel 72 and the chain 70 is adapted to pass around this sprocket wheel also. Both ends of the chain 70 are secured to the lugs 75 on the back gauge guide member 63 as clearly indicated in Figure 8. It will thus be seen that by turning the hand wheel 72, the gauge 55, which is connected with the guide member 63 as already described, can be moved toward or away from the knife 18 by the operator. The hand wheel 72 can be clamped in adjusted position by means of the locking handle 77, thereby locking the gauge 55 in its adjusted position.

In order to indicate to the operator the precise adjustment of the back gauge 55 the following mechanism is provided. Upon the upper end of the vertical rod 66 at the rear of the table there is provided a pulley 78. A similar wheel or pulley 79 is rotatably mounted upon the pin 80 provided at the upper middle portion of the arch frame 15 at the forward part of the machine. The center section of the back gauge 55 carries a post 81 which is secured as at 82 to one lap of the endless graduated tape 85 which passes around the pulleys 78 and 79. The forward bend of the tape passing around the pulleys 79 is visible through the opening 86 in the front face of the frame 15 and a pointer 87 is provided in order to indicate upon the tape the distance between the back gauge 55 and the edge of the knife 18.

*The driving mechanism and associated controls*

The power for driving the crank shaft 51 for operating the cutter is provided by an electric motor 90 upon the shaft of which is secured the V-belt pulley 91. The motor is suspended from the pivot pins 92 and its position may be adjusted within certain limits in order to tighten the belt, by means of the screw 93, the inner end of which is adapted to bear against a portion of the rear wall 12 of the frame 10. The V-belts 95 serve to connect the motor pulley 91 with the appropriately grooved fly wheel 96, the hub 97 of which is mounted upon the two sets of ball bearings 98 carried by the shaft 100. The ball bearing assemblies are spaced by the sleeve 99 which fits loosely in the bore of the hub 97 of the fly wheel.

The shaft 100 is disposed horizontally and rearwardly of the frame 10 and is journalled at one end in anti-friction bearings 101 carried by the bracket 102. A closure plate 103 and the oil seal 104 on the bracket 102 prevent leakage of oil from the bearing. The opposite end of the shaft 100 is rotatably supported by means of the bearing assembly 106 carried by the bracket 110 secured to the web 109 extending from the rear wall 12 of the main frame. Oil seals 111 and 112 carried by the bracket 110 prevent leakage of oil from the bearing assemblies. The flanged collar 115, whose function will be apparent as the description proceeds, is also fitted within the bore of the bracket 110 and abuts against the inner race of the ball bearing assembly. This collar also fits over the spline or key 116 provided in the shaft 100.

A disc clutch 120 is carried by the shaft 100 adjacent the fly wheel 96, and its driving plate 121 is operatively connected through a series of equally spaced pins 122 with the fly wheel. The jaws 124 which cause the blades of the clutch to engage are brought together by means of the sliding collar 125 which actuates the toggles 126. The actuating collar 125 is splined to the shaft 100 and is provided with an annular flange 130 which is rotatably received by the grooved split ring 131 which is provided with the trunnions 132. The clutch 120 is actuated by certain starting mechanism which is connected with the trunnions 132, and which constitutes the means for normally connecting and disconnecting the knife actuating eccentric 50 and the other operative mechanism with the source of power.

Another drive shaft 150 is disposed in alignment with the shaft 100 and enters the gear case or housing 54, being rotatably received by the anti-friction bearing assemblies 153 having suitable lubricant retaining means applied thereto. The portion of the shaft 150 which occupies the gear box 54 is provided with a worm 155 which meshes with the worm wheel 156 carried by the shaft 51 which also carries the eccentric 50.

The left hand end of the worm shaft 150, as viewed in Figures 11, 12, and 13 of the drawings, has a combined brake wheel and coupling member 165 keyed thereon as at 166. This member 165 is provided with a V-groove 167 formed peripherally therein and adapted to receive the upper and lower brake shoe elements 168 and 169 respectively. These members are fulcrumed upon the pin 170 which is carried by a hanger 171 forming an extension of the supporting bracket 110 to which reference has already been made. Keyed upon the right hand end of the drive shaft 100 as at 174 is the driving coupling member 175, best shown in Figures 11, 12, and 13. The member 175 is normally urged outwardly toward the member 165 carried by the shaft 150 by means of the springs 177 which are disposed within the pockets 178 formed in the member 175, and which bear at their outer ends against the collar 115. At diametrically oppositely disposed points in the brake wheel 165 there are inserted the hardened steel chucks 181. At corresponding points in the member 175 there are also inserted similarly formed chuck members 182. Received within the adjacent open ends of the chucks 181 and 182 of each pair are the small break pins 183 which are adapted to be sheared in two and thus release the driving connection between the member 175 and the member 165 upon the occurrence of overload on the cutting mechanism or under circumstances to which reference will be made.

As more clearly disclosed in Figures 5 and 8 of the drawings, the brake shoes 168 and 169 are provided with bifurcated extensions or ears 185 which are perforated to receive the pins 186. Both of the pins 186 are provided with vertically disposed openings to receive the rod 188, the lower end of the rod being threaded into the opening in the lower pin 186 and an intermediate portion of the rod passing freely through the opening in the upper pin 186. The upper end of the rod is provided with a small hand wheel 189 which provides an upper spring stop for the spring 190, the lower end of which rests upon the washer 191. It is obvious that rotation of the rod 188 in one direction will serve to increase the compression in spring 190 and the compression may be decreased by rotation of the rod in the opposite direction, thus varying the clamping pressure of the brake shoes.

Between the ears or lugs 185 formed on the respective brake shoes there are disposed the flanged rollers 192 which may be pivotally carried by the pins 193 on the ends of the brake shoes. The brake shoes may be spread apart against the pressure of the spring 190 by means of the wedge plate 195 which is provided with the two inclined surfaces 196 and which is extended as at 197 to be pivotally connected with one of the levers associated with the starting mechanism, so that the brake will be simultaneously released when the clutch 120 is engaged and vice versa. A steadying bolt 198 is secured to an extension 199 of the bracket 110 and has a bifurcated end 200 which is extended through the slot 201 in the wedge plate 195 and embraces the rod 188 in order to support and guide it, all as clearly shown in Figures 5 and 13.

Referring now more particularly to Figures 11 and 14 of the drawings it will be seen that the trunnions 132 of the clutch actuating collar 125 are engaged by the forked lower ends of the levers 205 and 206 which are fulcrumed upon the pin 207 carried by an extension 208 of the bracket 110. The lever 206 has an angular offset arm 209 to which the shank 197 of the brake actuating wedge plate 195 is pivotally connected as at 210. The upper ends of the levers 205, 206 are connected by the transverse pivot pin 212 which is also received within the slightly elongated opening 213 in the lower end of the crank 215 which is carried by the shaft 216 which has the bearings 217 and 218 in the rearward and forward walls 12 and 11 respectively of the main frame of the cutter, as clearly shown in Figure 8 of the drawings. Secured to the forward end 220 of the shaft 216, which projects exteriorly of the front wall 11 of the frame, is the upwardly extending crank 221 which is connected at its end by a horizontally extending link 222 with the end of the crank arm 223 carried by the longitudinally extending actuating shaft 225. Upon the forwardly projecting end of the shaft 225 there is fixed the starting lever 226 which is provided with the handle 227 for manual actuation. It will be noted that the link 222 is provided with a pin and slot connection as at 228 with the crank 223 so that the hand lever may be raised to some extent without moving the link 222.

It will be seen that when the starting lever 226 is depressed, the shaft 225 will be rotated in a clockwise direction as viewed in Figures 1 and 11, the shaft 216 will be rotated in a counter-clockwise direction, the connecting pin 212 will be moved toward the right in Figure 11, and the lower ends of the levers 205 and 206 will be moved toward the left carrying with them the clutch actuating sleeve 125 and causing the clutch 120 to engage so that power is transmitted from the fly wheel pulley 96 to the shaft 100 and thus through the break pin driving connection to the worm shaft 150 and thence through the worm wheel 156 and the longitudinal shaft 51 to the eccentric 50.

As best seen in Figures 12 and 14 of the drawings, the pin 212 which serves to connect the levers 205 and 206 with the crank arm 215 also provides a pivotal connection for the lower end 233 of the rod 235 which passes near its upper end through the head of the eye bolt 236 which is rigidly secured to the frame 10 as at 237 (see also Figures 7 and 8). The rod 235 is adapted to pass freely through the head 236 of the eye bolt and is provided at its upper end with the head or collar 238. Seated between the shouldered lower end 233 of the rod 235 and the head 236 of the eye bolt is the coil spring 240 which serves to urge the rod 235 downwardly and actuate the levers 205 and 206 to release the clutch 120. This motion is limited, of course, by the contact of the head 238 of the rod with the eye bolt 236.

The hand crank shaft 225 extends entirely through the frame 10, being rotatably mounted in the front and rear bearings 242 and 243 provided in the forward and rear walls 11 and 12 respectively. The shaft 225 projects rearwardly of the frame and, just beyond the bearing boss 243, freely rotatably carries the sleeve 245 from which projects the crank arm 246 and from which depends the angular latch member 250 having a squared end 251 adapted to be interposed between the eye bolt 236 and the head 238 of the spring rod 235 as clearly shown in Figures 4 and 12 of the drawings. Upon the extreme rear end of the shaft 225 there is fulcrumed the lever 254, the upper arm 255 of which is parallel with and connected to the end of the crank 246 by means of the pin 256 which carries a spacing sleeve 257 disposed between the arms 246 and 255. The lower arm 260 of the lever 254 is curved outwardly and downwardly as shown in Figures 4, 7, 9, and 12 and is provided at its lower end with a roller 261 which is adapted to be contacted by the cam member 262 carried by the rearwardly projecting end of the shaft 51 which extends through the rear wall of the gear box 54. This cam 262 is so designed with relation to the eccentric 50, carried by the same shaft 51, as to actuate the lever 254 at the end of every cutting stroke of the knife. It will be seen that upon movement of the lever 254 under the influence of the cam, the arms 255 and 246 will be depressed and the latch member 250 will be rotated in a counter-clockwise direction as viewed in Figure 12, the spring rod 235 will be depressed, the clutch 120 will be released, and the brake 165 will be set.

Upon the hand crank shaft 225 between the sleeve 245 and the fulcrum of the lever 254, there is keyed a sleeve 270 which is provided with an arm 271 which projects above the connecting sleeve 257 which extends between the lever arms 246 and 255. The sleeve 270 is also provided with a bifurcated arm 272 which is adapted to embrace the safety stop rod 275. This rod 275 is provided with a head 276 and a flange 277 both providing seats for the springs 278 and 279 which cause the upper and lower washers 280 to bear against the curved surfaces of the bifurcated arm 272 at all times. There is thus provided a resilient lost motion operating connection between the arm 272 and the safety rod 275. The lower end portion of the rod 275 passes through the bearings 282 and enters the gear case 54 where it is adapted for blocking engagement with the driving mechanism under certain conditions which will be hereinafter described.

Depending from a pivotal connection with the pin 256 adjacent the end of the arm 246 is the substantially vertically disposed link 285 which, as shown best in Figure 12, is pivotally connected at its lower end with the arm 286 of a bell crank lever 287 fulcrumed on the pin 288 secured to the frame 10. The opposite arm 289 of the bell crank lever is provided with a roller 290 which is adapted to be contacted by the flange 292 of the driving member 175 when the break pins 183 are sheared off under conditions of excessive load or upon actuation of the emergency stop which will be described. In order to effect this contact upon breakage of the pins the following mechanism is provided. In Figure 13 of the drawings it will be seen that pins 295 are received in the brake wheel 165 at diametrically opposite points which may be equally spaced from the position of the chucks 181. The pins 295 are provided with conical heads 296 which normally enter similarly shaped depressions 297 in the drive member 175. It will thus be seen that upon the severing of the break pins 183, the conical heads 296 will force the member 175 to the left upon continued rotation thereof after stoppage of the brake member 165. This will cause the bell crank lever 287 to rock in a clockwise direction as viewed in Figure 12, which will, through the link 285, move the arm 246 downwardly and withdraw the latch member 250 from beneath the head 238 of the spring rod 235, thus effecting the release of the clutch 120 as has already been explained.

It will now be seen that there are three ways in which the latch member 250 will be rotated in order to release the spring rod 235 and open the clutch. First, this may be effected by a reverse or counterclockwise rotation of the hand crank 226. This will cause a similar rotation of the shaft 225 and the sleeve 270 which will cause the arm 271 to contact with the connecting sleeve 257 and rock the arm 246 downwardly, thus removing the latch 250 with which said arm is integrally connected. Secondly, the latch member 250 will normally be automatically released at the end of each cutting stroke by means of the cam 262 acting through the lever 254 which through its upper arm 255 is connected with the latch crank 246, 250. Also, the latch 250 will be removed as has been described, by breakage of the pins 183 which will cause the drive member 175 to move to the left and rotate the latchcrank members through the bell crank 287 and the link 285. It should be pointed out that due to the configuration of the member 245, 246, 250 and the relation of the other parts thereto, the latch 250 will engage beneath the head 238 of the spring rod 235 by gravity, when it is not acted upon by any of the forces which have just been described. Engagement of the clutch 120 is therefore always maintained by means of the latch until the latter is positively removed, whereupon the pressure of the spring 240 will cause the rod 235 to descend, disengage the clutch, and through the wedge plate 195 set the brake 165.

*The non-repeat safety mechanism*

The lower end of the safety rod 275 which projects into the casing 54 is disposed adjacent the worm wheel 156, as clearly shown in Figures 15–19 of the drawings and is recessed as at 300 to permit the passage, under certain conditions, of the pin 301 which is carried by and projects laterally from the worm wheel. The lower side of the recess 300 is preferably of arcuate configuration as shown at 302.

Also secured to the same side of the worm wheel 156 and adapted to follow the pin 301, is the wedge member 305. During the clockwise rotation of the wheel as viewed in Figures 16–19, the wedge 305 is adapted to enter the notch or opening 300 in the safety rod 275 and, bearing against the curved surface 302, draw the rod 275 inwardly after the pin 301 has passed through the opening 300 during the first part of the cycle of rotation of the crank shaft 51. Figure 18 shows this inward wedging movement of the rod being effected. A pivoted latch member 306 is carried by the lever arm 272 and is provided with a shoulder as at 307 which engages behind the shoulder 277 on the rod 275 when the wedge 305 has drawn the rod downwardly a sufficient distance. This ensures that the rod is retained in this depressed position during the cycle of operation of the cutter. When the rod 275 is in this depressed position the pin 301 upon again approaching the rod 275 will not register with the opening 300 (see Figure 19) but will abut the rod at a point above this opening or recess and will effectively stop the rotation of the worm wheel 156 and thus of the driving eccentric 50, and prevent further movement of the knife. The collision of the pin 301 with the rod 275 and the consequent stoppage of the operating parts of the machine beyond the driving head 175 carried by the shaft 100 will cause the break pins 183 to shear off and the clutch 120 to be disengaged and the brake shoes 168 applied, through the mechanism which has already been described.

Normally, of course, the cam 262 operating through the roller 261 on the lever 254 will remove the latch 250 and permit the clutch to disengage and the brake to be applied at the end of each stroke and the mechanism which has just been described is intended to function as a safety mechanism whereby, in the event of failure of the normal operating means, only one stroke of the cutting knife for each deliberate depression of the starting lever can be made. In the absence of such mechanism a second knife stroke might occur through failure of the clutch plates to separate, a deliberate holding down of the starting lever 226, or a breakage of any of the elements in the train of mechanism intended to effect the stoppage of the machine at the end of one stroke. The latch member 306 becomes disengaged from the shoulder 277 of the safety rod 275 through contact of the tail 308 thereof with the inclined surface 309 of the casing 152, upon depression of the safety rod through the counterclockwise swinging of the arm 272 at the end of the cycle of movement of the cutter.

In order to permit the operator to employ the power driven mechanism of the cutter to cause the knife to descend to the bottom of its stroke and rest upon the wooden cutting stick 17 for removing the knife blade or for any other purpose, the following mechanism is provided. Ordinarily, if another complete cutting cycle is intended, the starting lever is swung all the way down and the latch 250 applied, but in this operation, the operator can jog or inch the clutch to cause the knife to descend slowly or by degrees. During this movement the pin 301 may be brought into contact with the rod 275, but under these circumstances a collision which would cause the break pins to shear will be prevented. To effect this purpose a shield member 310 is provided which is secured to the end of the arm 311 of the flat substantially annular member 312 which surrounds the hub 314 of the worm wheel 156. The member 312 is urged against the face of the wheel 156 by means of the coil spring 315 (Figure 15). A spring 317 is secured at one end to the shield member 310 as at 318 and the opposite end of the spring is secured to the pin 301. This serves to maintain these elements in their relative positions illustrated in Figures 16, 17, and 18 of the drawings. During the inching of the clutch and slow movement of the knife the front edge 320 of the shield 310 contacts with the rod 275, the spring 317 will be stretched, and the shield will be held stationary while the pin 301 moves forward into gentle contact with the rod 275. This position is indicated clearly in Figure 20 of the drawings. Now, upon re-engagement of the clutch during this slow inching or jogging of the cutter, the lever 272 will pull the rod 275 outwardly and the spring 317 will cause the shield 310 to snap into the recess 300 in the pin 275 and forwardly against the pin 301 again, as in Figure 17 If now, while the shield 310 is still passing through the recess 300, the clutch is again disengaged, the rod 275 will be prevented from moving inwardly when the lever 272 moves downwardly, thereby preventing a collision of pin 301 with the rod 275.

The clamping mechanism

For a clear disclosure of the mechanism for clamping the pile of paper which is to be cut, reference is made more particularly to Figures 8, 9, and 21-26 of the drawings. The paper clamp member is indicated by the reference numeral 350 and is provided with vertical plates or fingers 351 with which the fingers 55' of the back gauge are adapted to intermesh so that the back gauge 55 can be brought forwardly in order that piles of paper of very narrow width may be cut. The clamp is disposed immediately to the rear of the knife 18 and reciprocates vertically in guides 353 at the sides of the cutter and frame 10. The knife blade 20 is positioned about a half inch above the lower edge of the clamp 350 so that the clamp will be able to compress and apply pressure to a pile of paper of the maximum height before the knife contacts the pile.

On each side of the clamp 350 a flat vertically disposed pull bar 351 is secured, from each of which a swivel 352 is suspended. These swivels are connected by means of the short links 353 to the bifurcated arms 355 and 356 of the clamp actuating cranks 357 and 358 which are pivotally supported at opposite sides of the machine upon the shafts 360 and 361 respectively, both of these shafts being fixed in the frame 10. The ends of the arms 355 and 356 of the crank levers are connected by means of the flat connecting bar 363 which is bent as shown to avoid the hub of the crank member 357. Other short bifurcated lever arms 364 and 365 are formed on the cranks 357 and 358 and are joined by means of the connecting bar 366 which may be lengthened or shortened by means of the turnbuckle 367 provided with the lock nuts 368. This adjustment is for the purpose of maintaining the paper clamp 350 parallel with the table 16.

Upon the longitudinal drive shaft 51, between the eccentric 50 and the intermediate bearing 52a there is keyed the gear 370. Upon each side of the gear 370 a rocking arm 372 is rotatably mounted on the shaft 51. The upper ends of each of these rocking levers are provided with pins 373 upon which are rotatably carried the spaced gears 375 both of which mesh with the gear 370, which is of considerable width. A wrist pin 377 is received within the bushings 378 provided in each of the gears 375 and extends across the space intervening between these gears. A flat connecting rod 380 provides an operative connection between the wrist pin 377 and the end of the bifurcated lever arm 382 which extends downwardly from the crank 357. The connecting rod 380 is slotted as at 383 for the reception of the pin 384 which is secured within the forked ends of the lever 382. A bushing 385 surrounds the pin 384 and fits within the slot 383.

A rod 388 extends horizontally across the lower portion of the frame 10 from side to side thereof. On the left hand side of the frame as viewed in Figures 21, 25 and 26 the rod 388 passes through a bearing or boss 389 and at the right hand side of the frame the rod passes through an enlarged opening 390 and thence through the plate 391 which is secured to the frame 10. Nuts 392 serve to retain the rod in place. A cross head 395 is free to slide upon the rod 388 near the left hand end thereof and is provided upon each side with the trunnion pins 396 to which the ends of the flat parallel pull bars 397 are connected. An inverted U-shaped member 398 connects the pull bars 397 at their right hand ends. The lower ends of the two rocking arms 372 are provided with slots 399 through which the studs 400 are passed. These studs also pass through openings in the pull bars 397 and serve to adjustably connect these bars with the rocking arms 372 by selectively positioning the studs within the slots 399, for a purpose to be disclosed as the description proceeds. The nuts 401 serve to clamp the studs 400 to the arms 372. An elongated coil spring 405 surrounds the rod 388 and is confined under partial compression between the cross head 395 and the plate 391. A series of sleeves 406 is placed under the coils of the spring 405 and is free to slide over the rod 388. At intervals, tongues 407 formed on the sleeves 406 project between the coils of the springs 405. The function of these sleeves is to reduce wear on the rod 388 which would be considerable if the coils of the spring 405 were in direct contact with the rod 388.

One of the bifurcations of the arm 365 of the right hand clamp operating crank 358 is provided with an extension 408 on which the swivel 409 pivots. The spring guide rod 410 is fastened in the swivel 409 and projects through an opening in the boss 411 formed on the left hand side of the main frame 10. A pre-loaded coil spring 412 is guided on the rod 410 and is compressed between the boss 411 and the shouldered swivel 409, for the purpose of maintaining the clamp 350 in raised position.

The operation of the automatic clamp mechanism is as follows. Upon engagement of the clutch 120 the shaft 51 will begin its rotation, its cycle of movement as already described comprising a single rotation in order, through the driving eccentric 50, to cause the knife 18 to descend through the material to be cut and then return to its uppermost position. During this cycle the shaft 51 will rotate the gear 370 in a clockwise direction as indicated by the arrows in Figures 21, 25, and 26. The gears 375 which mesh with the gear 370 will rotate in a counterclockwise direction as indicated, and the wrist pin 377 will pass from its left hand dead center position shown in Figure 21 downwardly to the position indicated in Figure 25, at which point the clamp 350 will have been brought into firm contact with the pile of paper A. At this point the rotation of the clamp cranks 357 and 358 practically ceases. The pin 384 to which an end of the connecting bar 380 is connected also becomes substantially stationary. Then the continued rotation of the gears 375 through the driving action of the gear 370 will cause these gears 375 to make a planetary movement around the shaft 51 as a center, rocking the arms 372 in a counterclockwise direction until the wrist pin 377 passes through the right hand dead center position shown in Figure 26 of the drawings. This movement of the arms 372, through the pull bar connections 397 and the cross head 395, compresses the spring 405, and the pressure of this spring is amplified through the ratio of the gears and levers forming the operative connections of the clamping mechanism and transmitted to the pile of paper A during the cutting stroke of the knife. The required clamping pressure to prevent the bevel of the cutting blade 20 from shifting the sheets A from the back gauge 55 is quite considerable, amounting to several tons in the average cutter of this type.

It will be clearly apparent from the foregoing description that the higher the pile of paper A, the sooner the wrist pin 377 comes to its substantially stationary position and the greater the subsequent planetary movement of the gears 375. This results in a greater degree of compression in the spring 405 and consequently a greater developed pressure on the paper clamp 350. Thus, the amount of pressure on the pile of paper automatically adjusts itself to the height of the pile.

Another feature of this novel arrangement is that when the machine is at rest, the pre-compression pressure of the spring 405 is absorbed by the rod 388 in tensile stress on the nuts 392 and in compression on the hub or bearing 389 of the frame 10. Thus an additional safety feature is provided in that the spring 405 does not exert a torque on the driving mechanism which would be a source of danger to the operator of the machine. Furthermore, since the spring 405 is not compressed to the maximum amount when the machine is at rest, the life of the spring is materially increased. The amount of clamping pressure to be applied may be reduced by loosening the nuts 401 on the studs 400, moving the pull bar assembly 397, 398 upwardly and tightening the nuts 401 again after the studs have assumed their new positions at a higher point within the slots 399. This decrease in pressure will result from a somewhat decreased leverage as well as from a reduction in spring compression.

For the purpose of bringing the paper clamp 350 down upon the pile of paper A temporarily as, for example, in order to indicate to the operator the point at which the knife will cut the paper or in order to hold curly or easily disturbed paper stock before the full automatic clamping pressure is applied, there is provided a treadle operated means for actuating the clamp. For the clearest disclosure of this mechanism, reference is made to Figures 8 and 21. The treadle 420 extends longitudinally of the frame at the lowermost portion thereof and passes through slots 421 and 422 formed respectively in the front and rear walls 11 and 12. The rear end of the treadle is provided with a sleeve 424 which surrounds the drive shaft section 150 which provides a fulcrum for the treadle. An arm 425 extending upwardly from the treadle is pivotally connected as at 426 with the lower end of the link 427 which is provided with a slot 428 which receives the pin 429 carried by the connecting bar 363 which extends between the clamp operating arms 355 and 356 of the cranks 357 and 358. The slot 428 provides a lost motion connection which will prevent the movement of the treadle when the clamp is operated by the automatic drive. The hub or sleeve 424 of the treadle is also provided with an upwardly extending forked arm 430 to the upper end of which is pivotally connected one end of the spring rod 432. A spring stop 434 is secured to this rod and serves to compress the spring 435 against the boss 436 carried by the front wall 11 of the frame and into which the end of the rod 432 is guided. The spring 435 counterbalances the weight of the treadle 420 and maintains it, when in idle position, against the end 437 of the slot 421 in the front wall 11 of the frame. When the treadle 420 is depressed, the connecting bar 363 is pulled downwardly by means of the link 427 thus rotating the cranks 357 and 358 and depressing the clamp 350. During this manual movement the pin 384 carried by the lever arm 382 of the crank 357 moves idly in the slot 383 formed in the driving connecting rod 380. When the foot pressure is released, the pressure of the spring 410 will raise the clamp 350 through its connection with the clamp crank 358.

Operation

The operation of the cutting machine will now be reviewed or summarized and there will be pointed out in connection therewith the functioning of the various safety devices under abnormal or emergency conditions. The paper to be cut is placed upon the table 16 against the back gauges 55 which have already been locked in position determined by the width of the sheet desired which is indicated on the graduated tape 85 as viewed through the opening 86. The point at which the knife will strike the paper may be determined by depressing the clamp 350 by means of the treadle 420. This will give the position of contact of the knife edge rather accurately since the forward edge of the clamp 350 is disposed just adjacent the edge of the knife blade 20 as clearly indicated in Figure 8 of the drawings. If the paper is thin or has a tendency to curl, the clamp 350 may be held in depressed position by the foot treadle until the automatic clamping mechanism comes into play during the cutting stroke.

The paper having been placed in proper position upon the table 16, the hand lever 226 is depressed, thus moving the levers 221, 205 and 206 in directions which will cause the plates of the clutch 120 to engage and the rod 235 to be moved through the eye of the bolt 236 permitting the latch 250 to move into position between the head 238 of the rod 235 and the eye bolt 236 as shown in Figures 11 and 12. This movement will also disengage the brake shoes 168 and 169 from the brake wheel 165 and start the rotation of the driving eccentric 50 carried by the shaft 51. The depression of the hand lever 226 will, through the rotation of the shaft 225 and the hub or sleeve 270, rock the bifurcated lever arm 272 in a clockwise direction and raise the safety bar 275 so that the pin 301 on the worm wheel 156 may pass through the notch 300 in the bar 275, as shown in Figure 16. Continued rotation of the shaft 51 and eccentric 50 will cause the knife 18 to descend, cut the paper, and return to its uppermost position. At the end of this cycle of movement, the cam 262 will rock the lever 254, throw the latch 250 out of its position beneath the head 238 of the rod 235 and the spring 240 will force the rod downwardly and reverse the movement of the levers 205 and 206, thus releasing the clutch 120 and setting the brake 165, 168. Through the link 222 connecting the levers 221 and 223, the starting shaft 225 and its lever 272 will be rotated in a counterclockwise direction, and will cause the rod 275 to descend and release the latch 306, as indicated in the upper portion of Figure 20. During this cycle of operation, the automatic clamp 350 is operated as already described.

In case an overload on the cutter is encountered during the operation of the device, the break pins 183 which provide the driving connection between the members 165 and 175 carried respectively by the shaft sections 150 and 100 will be sheared off and the cam headed pins 295 will force the driving member 175 away from the member 165, this resulting, through the contact of the member 175 with the roller 290, in rotating the crank 289 and, through the link 285 and the lever arm 246, releasing the latch 250 and permitting the spring 240 to throw out the clutch 120 and apply the brake shoes 168, thus stopping the cutting operation immediately.

Even though the starting hand lever 226 is held down after a single cut has been completed, either purposely or through some inadvertence, the cutter will not pass through more than one cycle of operation. Repeating of the cutting movement is prevented by the following operations. The wedge 305 carried by the worm wheel 156 will draw the safety rod 275 inwardly as shown in Figure 18 of the drawings whereupon the latch 306 will catch on the shoulder 277 of the rod 275 as shown in Figure 19, and retain the rod in its inward position regardless of the position of the lever 272 connected with the hand crank 226. Then after completion of one rotation of the worm wheel 156, the pin 301 will strike the rod 275 and further rotation will be prevented. This collision would, of course, cause the break pins 183 to shear and the clutch 120 would be disengaged and brake shoes 168 would be applied.

A similar operation would ensue through failure of the clutch plates to release at the end of the first revolution.

The operation of the device may be halted at any point during its cycle of movement by a reverse rotation of the starting lever 226. This will cause the lever arm 271 to descend, contact with the sleeve 257 connecting the ends of the levers 246 and 255 and depress this connection, thus releasing the latch 250 and disengaging the clutch 120 and applying the brake.

It is to be understood that the embodiment of the invention shown and described herein is for illustrative purposes only and that various changes and modifications may be made therein without departing from the scope of the invention as defined in the following claims.

Having thus described the invention, what is claimed as new and desired to be secured by Letters Patent is:

1. In a cutting machine of the class described, in combination, a work support, means for clamping the work on said support, a knife, means for operating said knife and said clamping means, transmission mechanism connecting said operating means with said knife and said clamping means, and a break pin incorporated in said transmission and adapted to be severed upon the occurrence of an overload or obstruction to the operation of said transmission means beyond a predetermined amount.

2. In a cutting machine of the class described, in combination, a work support, a knife, means for operating said knife, transmission mechanism connecting said operating means with said knife, said transmission mechanism including a pair of aligned rotatable shafts, driving and driven members respectively carried by the adjacent ends of said shafts, a break pin connecting said members at points radially outward from their centers, and adapted to be severed upon the occurrence of overload, means for moving one of said members longitudinally of its shaft upon the breaking of the pin, and means actuated by said movement to stop said transmission.

3. In a cutting machine of the class described, in combination, a work support, a knife, means for operating said knife, transmission mechanism connecting said operating means with said knife, said transmission mechanism including a pair of aligned shafts, driving and driven members carried by the adjacent ends of said shafts, a break pin connecting said members at points radially outward from their centers, and adapted to be severed upon the occurrence of overload, chucks disposed in adjacent faces of said members at points spaced radially from their centers and adapted to receive the opposite end of a break pin which is adapted to shear upon the occurrence of unusual resistance to operation of the device, at least one of said chucks being removable for replacing the break pin.

4. In a cutting machine of the class described, in combination, a work support, a knife, power means for operating said knife, transmission means connecting said knife and said power means, a frangible connection in said transmission means adapted to break in the event an overload on said cutter or an obstruction to the operation of the transmission is encountered, and means automatically operable upon the breaking of the frangible connection adapted to disconnect said transmission mechanism for said power means.

5. In a cutting machine of the class described, in combination, a work support, a knife, power means for operating said knife, transmission mechanism operatively connecting said knife with said power means, a frangible connection embodied in said transmission means adapted to break in the event of an overload on said cutter or an obstruction to the operation of said transmission means is encountered, a clutch disposed in said transmission means on the power side of said frangible connection, and a brake disposed upon the knife side of said connection and adapted to be applied to an element of said transmission to stop the knife, and means operable upon the breaking of said frangible connection to release said clutch and apply said brake.

6. In a cutting machine of the class described, in combination, a work support, a knife, power means for operating said knife, transmission mechanism operatively connecting said knife with said power means, a frangible connection embodied in said transmission means adapted to break in the event of an overload on said cutter or an obstruction to the operation of said transmission means is encountered, a clutch disposed in said transmission means and a brake adapted to be applied to an element of said transmission to stop the knife, and means operable upon the breaking of said frangible connection to release said clutch and apply said brake.

7. In a cutting machine of the class described, in combination, a work support, a knife, power means for operating said knife, transmission mechanism operatively connecting said knife with said power means, said transmission mechanism including two adjacent rotatable shafts, driving and driven members respectively carried by the adjacent ends of said shafts, said driven member constituting a brake wheel, a brake element adapted to be applied to said wheel, a break pin driving connection between said members which is adapted to be severed upon the occurrence of overload, and means for automatically applying said brake upon the severing of the driving connection between said members.

8. In a cutting machine of the class described, in combination, a work support, a knife, power means for operating said knife, transmission mechanism operatively connecting said knife with said power means, said transmission mechanism including a driving member and a driven member, said driven member constituting a brake wheel, a brake element adapted to be applied to said wheel, a frangible driving connection between said members which is adapted to be broken upon the occurrence of overload, a clutch interposed in said transmission mechanism between said power means and said driving member, and means for automatically releasing said clutch and applying said brake upon the breaking of said driving connection between said members.

9. In a cutting machine of the class described, in combination, a work support, a knife, power means for operating said knife, transmission mechanism operatively connecting said knife with said power means, said transmission mechanism including a driving member and a driven member, said driven member constituting a brake wheel, a brake element adapted to be applied to said wheel, a break pin driving connection between said members which is adapted to be severed upon the occurrence of overload, a clutch interposed in said transmission mechanism between said power means and said driving member, and means for moving said driving and driven members apart upon the severing of said driving connection, and means actuated by said movement for applying said brake and releasing said clutch.

10. In a cutting machine of the class described, in combination, a work support, a knife, power means for operating said knife, transmission mechanism operatively connecting said knife with said power means, said transmission mechanism including a driving member and a driven member, a clutch interposed in said transmission mechanism between said power means and said driven member, a break pin driving connection between said members which is adapted to be broken upon the occurrence of overload, wedging means on one of said members adapted to move said members apart upon the occurrence of relative movement between the two, operative connections between one of said members and said clutch, whereby upon relative movement between said members said clutch is released.

11. In a cutting machine of the class described, in combination, a work support, a knife, power means for operating said knife, transmission mechanism operatively connecting said knife with said power means, a frangible connection embodied in said transmission mechanism, a stop element adapted to be positively interposed in said transmission on the knife side of said frangible connection, non-repeat mechanism for interposing said stop element during the cycle of operation of the knife, whereby upon continued operation of said power and transmission means beyond the completion of one cycle of operation of the knife, said frangible connection will break.

12. In a cutting machine of the class described, in combination, a work support, a knife, power means for operating said knife, transmission mechanism operatively connecting said knife with said power means, a frangible connection embodied in said transmission mechanism, non-repeat mechanism adapted to stop the movement of said knife substantially at the end of one cycle of movement thereof, whereby said frangible connection will break if said power means and said transmission mechanism are operated beyond the completion of said cycle of movement.

13. In a cutting machine of the class described, in combination, a work support, a knife, power means for operating said knife, transmission mechanism operatively connecting said knife with said power means, a frangible connection embodied in said transmission mechanism, a stop element adapted to be positively interposed in said transmission on the knife side of said frangible connection, non-repeat mechanism for interposing said stop element during the cycle of operation of the knife, whereby upon continued operation of said power and transmission means beyond the completion of one cycle of operation of the knife, said frangible connection will break, a clutch interposed in said transmission between said power means and said frangible connection, a brake adapted to be applied to an element of said transmission between said frangible connection and said knife, means set in operation by the breaking of said frangible connection to release said clutch and apply said brake.

14. In a cutting machine of the class described, in combination, a work support, a knife, power means for operating said knife, transmission mechanism operatively connecting said knife with said power means, said transmission including two aligned shafts, driving and driven members respectively carried by the adjacent ends of said shafts, a frangible driving connection between said members adapted to be broken upon the occurrence of overload, a cam headed pin carried by one of said members, and adapted to normally fit into a similarly cam shaped recess in the other of said members, one of said members being shiftable longitudinally on its shaft, a clutch interposed between said power means and said transmission operatively connecting between said shiftable member and said clutch whereby upon breaking of said frangible connection continuous rotation of one of said members with respect to the other will cause the cams to shift said member and release the clutch.

15. In a device of the class described, in combination, a releasable driving connection comprising aligned driving and driven shafts, driving and driven heads respectively carried by the adjacent ends of said shafts, one of said heads being longitudinally movably mounted on its shaft, a break pin socketed in each of said heads at points radially spaced from the axis of said shafts and adapted to break upon the occurrence of overload on the driven shaft, a boss having an inclined face on one of said heads and adapted normally to be received within a recess in the other of said heads having a similarly inclined face, said cooperating boss and recess also being spaced from the axis of said shaft, whereby upon relative rotation of said shafts upon severing of the break pin, said longitudinally movable head will be shifted away from the other of said heads.

16. In a cutting machine of the class described, in combination, a work support, a knife, power means for operating said knife, transmission mechanism operatively connecting said knife with said power means, said transmission mechanism including a clutch for connecting and disconnecting said mechanism from said power means, means continually urging the members of said clutch toward disengagement, manually operable means for engaging said clutch in opposition to said last named means, a detent member adapted to be applied to said urging means by operation of said manually operable means to prevent disengagement, and means set in motion by the occurrence of an overload on said cutter to release said detent.

17. In a cutting machine of the class described, in combination, a work support, a knife, power means for operating said knife, transmission mechanism operatively connecting said knife with said power means, said transmission mechanism including a clutch for connecting and disconnecting said mechanism from said power means, resilient means continually urging the members of said clutch toward disengagement, manually operable means for engaging said clutch in opposition to said resilient means, a detent member adapted to be applied to said resilient means by operation of said manually operable means to prevent disengagement, and manually operable means for releasing said detent.

18. In a cutting machine of the class described, in combination, a work support, a knife, power means for operating said knife, transmission mechanism operatively connecting said knife with said power means, said transmission mechanism including a clutch for connecting and disconnecting said mechanism from said power means, spring pressed means continually urging the members of said clutch toward disengagement, manually operable means for engaging said clutch in opposition to said spring pressed means, a detent member adapted to be applied to said spring pressed means by operation of said manually operable means to prevent disengagement, and means automatically operative substantially at the end of one cycle of movement of said knife to release said detent.

19. In a cutting machine of the class described, in combination, a work support, a knife, power means for operating said knife, transmission mechanism operatively connecting said knife with said power means, said transmission mechanism including a clutch for connecting and disconnecting said mechanism from said power means, spring pressed means continually urging the members of said clutch toward disengagement, manually operable means for engaging said clutch in opposition to said spring pressed means, a detent member adapted to be applied to said spring pressed means by operation of said manually operable means to prevent disengagement, said transmission connection also including a frangible connection adapted to break upon the encountering of excessive resistance to operation of the cutter, and means set in motion by the breaking of said connection to release said detent and thus effect the disengagement of the clutch.

20. In a cutting machine of the class described, in combination, a work support, a knife, power means for operating said knife, transmission mechanism operatively connecting said knife with said power means, said transmission mechanism including a clutch for connecting and disconnecting said mechanism from said power means, spring pressed means continually urging the members of said clutch toward disengagement, manually operable means for engaging said clutch in opposition to said spring pressed means, a detent member adapted to be applied to said spring pressed means by operation of said manually operable means to prevent disengagement, said transmission connection also including a frangible connection adapted to break upon the encountering of excessive resistance to operation of the cutter, means set in motion by the breaking of said connection to release said detent and thus effect the disengagement of the clutch, and a non-repeat device adapted to release said detent and disengage said clutch at the end of one cycle of movement of said cutter.

21. In a cutting machine of the class described, in combination, a work support, a knife, power means for operating said knife, transmission mechanism operatively connecting said knife with said power means, said transmission mechanism including a clutch for connecting and disconnecting said mechanism from said power means, spring pressed means continually urging the members of said clutch toward disengagement, manually operable means for engaging said clutch in opposition to said spring pressed means, a detent member adapted to be applied to said spring pressed means by operation of said manually operable means to prevent disengagement, said transmission connection also including a frangible connection adapted to break upon the encountering of excessive resistance to operation of the cutter, means set in motion by the breaking of said connection to release said detent and thus effect the disengagement of the clutch, a positive stop means for said cutter, non-repeat mechanism adapted to be automatically actuated during one cycle of movement of the cutter to set said positive stop means to halt the operation of the knife substantially at the end of one cycle of movement whereby said frangible connection is broken and said clutch is disengaged.

22. In a cutting machine of the class described, in combination, a work support, a knife, power means for operating said knife, transmission mechanism operatively connecting said knife with said power means, said transmission mechanism including a clutch for connecting and disconnecting said mechanism from said power means, spring pressed means continually urging the members of said clutch toward disengagement, manually operable means for engaging said clutch in opposition to said spring pressed means, a detent member adapted to be applied to said spring pressed means by the operation of said manually operable means to prevent disengagement, said transmission connection also including a frangible connection adapted to break upon the encountering of excessive resistance to operation of the cutter, means set in motion by the breaking of said connection to release said detent and thus effect the disengagement of the clutch, a non-repeat device adapted to release said detent and disengage said clutch at the end of one cycle of movement of said cutter, a positive stop means for said cutter, another non-repeat mechanism adapted to be automatically actuated during one cycle of movement of the cutter to set said positive stop means to halt the operation of the knife substantially at the end of one cycle of movement whereby said frangible connection is broken and said clutch is disengaged, in case of failure of said first mentioned non-repeat mechanism.

23. In a cutter of the class described, in combination, a work table, a knife, power means for operating said knife, transmission means operatively connecting said knife with said power means, a stop member movable into and out of the path of an element of said transmission, starting means for said transmission mechanism and knife, means operatively connected with said starting means for withdrawing said stop member from the path of said element to permit the passing of said element, means for automatically returning said stop to its effective position in the path of said element after it has once passed said stop member to prevent a second cut of said knife without a positive release of said stop means.

24. In a cutter of the class described, in combination, a work table, a knife, power means for operating said knife, transmission means operatively connecting said knife with said power means, a rotary member embodied in said transmission, a rigid projection on said rotary member, a stop member movable into and out of the orbit of said projection, starting means for said transmission mechanism and knife, means operatively connected with said starting means for withdrawing said stop member from the orbit of said projection, means for automatically returning said stop to its effective position in the orbit of said projection during a later portion of the cycle of rotation of said rotary member to prevent a second cut of said knife without a positive release of said stop means.

25. In a cutter of the class described, in combination, a work table, a knife, power means for operating said knife, transmission means operatively connecting said knife with said power means, a rotary element in said transmission mechanism adapted to make one complete rotation during each cycle of movement of said knife, a movable abutment adapted to be disposed in the path of movement of said element and withdrawn therefrom, starting means for said transmission, means operatively connected with said starting means for withdrawing said abutment from the path of said element, means connected with said rotary element for automatically returning said abutment to said path after passage of said element, and detent means for holding said abutment in said path until positively released.

26. In a cutter of the class described, in combination, a work table, a knife, power means for operating said knife, transmission means operatively connecting said knife with said power means, a rotary element in said transmission mechanism adapted to make one complete rotation during each cycle of movement of said knife, a movable abutment adapted to be projected into the path of movement of said element and withdrawn therefrom, starting means for said transmission, means operatively connected with said starting means for withdrawing said abutment from the path of said element, means connected with said rotary element for automatically returning said abutment to said path after passage of said element, detent means for holding said abutment in said path until positively released, means for normally automatically stopping said cutter at the end of one cycle of cutting movement, and means associated with said last named means for releasing said detent.

27. In a cutter of the class described, in combination, a work table, a knife, power means for operating said knife, transmisson means operatively connecting said knife with said power means, a rotary member driven by said power means in synchronism with said transmission and said knife, and adapted to make one complete rotation during each cycle of movement of said knife, an abutment portion on said member, a stop member adapted to be projected into and out of the path of said abutment portion, starting means for said transmission, a resilient connection between said stop member and said starting means for effecting the withdrawal of said stop member from the path of said abutment portion but permitting movement of said stop member independently of said starting means and in opposition to the urging of said resilient connection, means on said rotary member for automatically returning said stop member to said path after passage of said abutment portion regardless of the position of said starting means, a detent adapted to hold said starting means and said stop member in positions displaced from their normal relative positions in order to retain said stop member in the path of said abutment portion until positively released, and means for releasing said detent upon the next reverse movement of said starting means.

28. In a cutter of the class described, in combination, a work table, a knife, power means for operating said knife, transmission means operatively connecting said knife with said power means, a rotary member driven by said power means in synchronism with said transmission and said knife, and adapted to make one complete rotation during each cycle of movement of said knife, an abutment element carried by said rotary member, a reciprocating stop pin slotted to permit the passage of said element in one position of the pin, manually operable starting means for said transmission, a spring connection between said starting means and said stop pin for reciprocating the latter to cause the slot to register with the path of said abutment element but permitting relative movement of said pin and starting means against the resilient pressure of the spring connection, camming means carried by said rotary member adapted to enter said slot after passage of said element and move said pin against the resistance of said spring connection so that the unslotted portion thereof lies in the path of said abutment element, a detent adapted to be automatically interposed between portions of said starting means and said pin to hold them in the relatively displaced positions resulting from said camming movement, and means for tripping said detent upon reverse movement of said starting means.

29. In a cutter of the class described, in combination, a work table, a knife, power means for operating said knife, transmission means operatively connecting said knife with said power means, a stop member movable into and out of the path of an element of said transmission, starting means for said transmission mechanism and knife, means operatively connected with said starting means for withdrawing said stop member from the path of said element to permit the passing of said element, means for automatically returning said stop to its effective position in the path of said element after it has once passed said stop member to prevent a second cut of said knife without a positive release of said stop means, and a frangible connection in said transmission in advance of said element adapted to break upon the occurrence of a collision between said element and said stop member.

30. In a cutter of the class described, in combination, a work table, a knife, power means for operating said knife, transmission means operatively connecting said knife with said power means, a rotary element in said transmission mechanism adapted to make one complete rotation during each cycle of movement of said knife, a movable abutment adapted to be disposed in the path of movement of said element and withdrawn therefrom, starting means for said transmission, means operatively connected with said starting means for withdrawing said abutment from the path of said element, means connected with said rotary element for automatically returning said abutment to said path after passage of said element, detent means for holding said abutment in said path until positively released, a frangible connection in said transmission in advance of said element adapted to break upon the occurrence of a collision between said element and said stop member, and means actuated by the breaking of said frangible connection for stopping said transmission.

31. In a cutter of the class described, in combination, power means for operating said knife, transmission mechanism operatively connecting said knife with said power means, a clutch interposed between said power means and said transmission mechanism, manually operated means for engaging said clutch to start the operation of the cutter, an abutment element on said member, a stop member adapted to be projected into and out of the path of said abutment element, a resilient connection between said stop member and said manually operated means, for effecting the withdrawal of said stop member from the path of said abutment element but permitting movement of said stop member independently of said starting means and in opposition to the urging of said resilient connection, means on said rotary member for automatically returning said stop member to said path after passage of said abutment element, a detent adapted to hold said manually operated means and said stop member in positions displaced from their normal relative positions in order to retain said stop member in the path of said abutment element until positively released, means for releasing said detent upon the next reverse movement of said starting means, and a spring pressed guard member on said rotary member adapted to abut said stop pin during partial engagement of the clutch by said manually operated means to advance the knife cutter slowly during a portion of its cycle, as for the purpose of removing the knife from the machine, said guard member being adapted to spring into the notch of said pin and prevent a collision between said pin and said element upon a subsequent engagement of said clutch.

32. In a cutter of the class described, in combination, power means for operating said knife, transmission mechanism operatively connecting said knife with said power means, a clutch interposed between said power means and said transmission mechanism, manually operated means for engaging said clutch to start the operation of the cutter, an abutment element on said member, a stop member adapted to be projected into and out of the path of said abutment element, a resilient connection between said stop member and said manually operated means, for effecting the withdrawal of said stop member from the path of said abutment element but permitting movement of said stop member independently of said starting means and in opposition to the urging of said resilient connection, means on said rotary member for automatically returning said stop member to said path after passage of said abutment element, a detent adapted to hold said manually operated means and said stop member in positions displaced from their normal relative positions in order to retain said stop member in the path of said abutment element until positively released, means for releasing said detent upon the next reverse movement of said starting means, an elongated guard member carried loosely by said rotary member and normally adapted to enter said slot together with said element, a spring resiliently connecting said guard member with said element, whereby upon partial or intermittent engagement and disengagement of said clutch one end of said guard member will abut this pin, the connecting spring will be distended as the abutment element advances, and upon a subsequent engagement of the clutch the guard member will enter said slot and prevent the movement of said pin to stop position until said abutment element has cleared the slot.

33. In a cutting device of the class described, in combination, a work table, a knife adapted during a single cycle of movement to pass through the work and then return to its initial position, power means for operating said knife, a work clamp, operating means connecting said clamp with said power means for causing said clamp to approach the work, contact it, and then apply increasing pressure thereto during the cutting stroke of the knife, means embodied in said operating means for increasing the pressure applied to said work according to the thickness thereof, and also counteracting means for preventing the pressure from increasing in direct ratio to the increase in the thickness of the work.

34. In a cutting device of the class described, in combination, a work table, a knife adapted during a single cycle of movement to pass through the work and then return to its initial position, power means for operating said knife, a work clamp, operating means connecting said clamp with said power means for causing said clamp to approach the work, contact it, and then apply increasing pressure thereto during the cutting stroke of the knife, a crank embodied in said operating means for actuating said clamp, spring means for causing resiliently yielding pressure to be applied to said clamp, a connection between said crank and said spring means disposed to decrease the moment arm of said crank as said spring pressure increases, whereby the pressure is prevented from increasing in direct ratio to the increase in the thickness of the work.

35. In a cutting device of the class described, in combination, a work table, a knife adapted during a single cycle of movement to pass through the work and then return to its initial position, means for operating said knife, a work clamp adapted during the cycle of movement of said knife to approach the work, contact it, apply pressure thereto, release said pressure and return to its initial position, operating means for said clamp comprising means for moving said clamp into contact with the work, and spring means adapted to remain unaffected during the approach of the clamp to the work, but to be brought into operation upon occurrence of said contact to apply said pressure.

36. In a cutting device of the class described, in combination, a work table, a knife adapted during a single cycle of movement to pass through the work and then return to its initial position, means for operating said knife, a work clamp adapted during the cycle of movement of said knife to approach the work, contact it, apply pressure thereto, release said pressure and return to its initial position, operating means for said clamp comprising a crank, linkage connecting said crank with said clamp, means for rotating said crank about a substantially stationary center during movement of said clamp into contact with the work, and about a continuously moving center during the pressure applying portion of the cycle of movement of said clamp.

37. In a cutting device of the class described, in combination, a work table, a knife adapted during a single cycle of movement to pass through the work and then return to its initial position, means for operating said knife, a work clamp adapted during the cycle of movement of said knife to approach the work, contact it, apply pressure thereto, release said pressure and return to its initial position, operating means for said clamp comprising a crank, linkage connecting said crank with said clamp, means for rotating said crank about a substantially stationary center during movement of said clamp into contact with the work, and about a continuously moving center during the pressure applying portion of the cycle of movement of said clamp, and means for resisting the movement of said center of rotation.

38. In a cutting device of the class described, in combination, a work table, a knife adapted during a single cycle of movement to pass through the work and then return to its initial position, means for operating said knife, a work clamp adapted during the cycle of movement of said knife to approach the work, contact it, apply pressure thereto, release said pressure and return to its initial position, operating means for said clamp comprising a crank, linkage connecting said crank with said clamp, means for rotating said crank about a substantially stationary center during movement of said clamp into contact with the work, and about a continuously moving center during the pressure applying portion of the cycle of movement of said clamp, and spring means for resiliently and increasingly resisting the movement of said center of rotation.

39. In a cutting device of the class described, in combination, a work table, a knife adapted during a single cycle of movement to pass through the work and then return to its initial position, means for operating said knife, a work clamp adapted during the cycle of movement of said knife to approach the work, contact it, apply pressure thereto, release said pressure and return to its initial position, operating means for said clamp comprising a crank, linkage connecting said crank with said clamp, means for rotating said crank about a substantially stationary center during movement of said clamp into contact with the work, and about a continuously moving center during the pressure applying portion of the cycle of movement of said clamp, means for resisting the movement of said center of rotation, and means for regulating the resistance of said last named means.

40. In a cutting device of the class described, in combination, a work table, a knife, means for moving said knife through a single cycle to cut said work and return to its initial position, a work clamp, operating means for said clamp for causing it to approach said work, contact it, and apply pressure thereto, said operating means comprising a driving gear, a driven gear, a crank pin on said driven gear, a connecting rod between said clamp and said crank pin, means for rotating said driving gear whereby said driven gear and said crank pin are rotated to bring said clamp into contact with said work, means for resiliently and movably supporting said driven gear whereby upon continued rotation of said gears and crank pin after such contact, said driven gear is displaced against spring pressure to apply pressure to the work.

41. In a device of the class described, in combination, a work table, a clamp for applying pressure to said work during operation thereon, operating means for said clamp for bringing it into contact with said work and applying pressure thereto, comprising a driving gear having a relatively fixed axis, a driven gear meshing with said driving gear and movably supported to planet about the latter, a crank pin carried by said driven gear, a connecting rod between said pin and said clamp, said pin being in a substantially dead center position when said clamp is in its initial position, means for rotating said gears and crank pin, resilient supporting means for said driven gear for holding it in a normal position with respect to said driving gear during movement of said clamp into contact with the work and for causing said driven gear to planet about said driving gear against spring pressure from the time that the clamp makes contact with the work until the crank pin passes the opposite dead center position.

42. In a device of the class described, in combination, a work table, a clamp for applying pressure to said work during operation thereon, operating means for said clamp for bringing it into contact with said work and applying pressure thereto, comprising a driving gear having a relatively fixed axis, a driven gear meshing with said driving gear, an axle for said driven gear, a lever carrying said axle at one end and supported intermediate its length for pivotal movement about the axis of said driving gear, a resilient counterbalancing member connected with the opposite end of said lever and adapted to be brought into action to resist pivotal movement of said lever, a crank pin carried by said driven gear, a connecting rod between said clamp and said crank pin, means for rotating said driving gear, said driven gear, and said crank pin to bring said clamp into contact with the work, further rotation of said parts causing said driven gear to planet around said driving gear against the resistance of said counterbalancing member thus applying resilient pressure to the work through said lever.

43. In a device of the class described, in combination, a work table, a clamp for applying pressure to said work during operation thereon, operating means for said clamp for bringing it into contact with said work and applying pressure thereto, comprising a driving gear having a relatively fixed axis, a driven gear meshing with said driving gear, an axle for said driven gear, a lever carrying said axle at one end and supported intermediate its length for pivotal movement about the axis of said driving gear, a spring element applied to the opposite end of said lever for resiliently resisting pivotal movement of said lever, a crank pin carried by said driven gear, a connecting rod between said clamp and said crank pin, means for rotating said driving gear, said driven gear, and said crank pin to bring said clamp into contact with the work, further rotation of said parts causing said driven gear to planet around said driving gear against the resistance of said spring element thus applying resilient pressure to the work through said lever.

44. In a device of the class described, in combination, a work table, a clamp for applying pressure to said work during operation thereon, operating means for said clamp for bringing it into contact with said work and applying pressure thereto, comprising a driving gear having a relatively fixed axis, a driven gear meshing with said driving gear, an axle for said driven gear, a lever carrying said axle at one end and supported intermediate its length for pivotal movement about the axis of said driving gear, a resilient counterbalancing member connected with the opposite end of said lever and adapted to be brought into action to resist pivotal movement of said lever, a crank pin carried by said driven gear, a connecting rod between said clamp and said crank pin, means for rotating said driving gear, said driven gear, and said crank pin to bring said clamp into contact with the work, further rotation of said parts causing said driven gear to planet around said driving gear against the resistance of said counterbalancing member thus applying resilient pressure to the work through said lever, and means for adjusting the point of connection of said counterbalancing member with said lever to regulate the pressure to be applied to said work.

45. In a device of the class described, in combination, a work table, a clamp for applying pressure to said work during operation thereon, operating means for said clamp for bringing it into contact with said work and applying pressure thereto, comprising a driving gear having a relatively fixed axis, a driven gear meshing with said driving gear, an axle for said driven gear, a lever carrying said axle at one end and supported intermediate its length for pivotal movement about the axis of said driving gear, a spring element applied to the opposite end of said lever for increasingly resiliently resisting pivotal movement of said lever, a crank pin carried by said driven gear, a connecting rod between said clamp and said crank pin, means for rotating said driving gear, said driven gear, and said crank pin to bring said clamp into contact with the work, further rotation of said parts causing said driven gear to planet around said driving gear against the increasing resistance of said spring element, thus applying resilient pressure to the work through said lever, the ultimate degree of pressure applied to the work thus being proportional to the travel of said driven gear and consequently to the thickness of the work.

46. In a device of the class described, in combination, a work table; a knife; a drive shaft adapted during one cycle of its movement to cause the knife to pass through said work and return to its initial position; an automatically operated work clamp; an operating connection between said clamp and said drive shaft for causing said clamp during said cycle of movement to approach the work, contact it, apply pressure thereto, release said pressure and resume its initial position; said operating connection comprising a driving gear carried by said shaft, a driven gear meshing with said driving gear, an axle for said driven gear, a yoke supporting said axle at one end and pivotally mounted on said shaft at an intermediate point, linkage adjustably connected with said yoke at its opposite end, a spring element adapted to be compressed by said linkage upon pivotal movement of said yoke, a crank pin carried by said driven gear, a connecting rod between said clamp and said crank pin; the initial and final positions of said crank pin being the adjacent dead center position, and the intermediate position of said pin at midstroke of both the knife and clamp being the remote dead center position with respect to said connecting rod; whereby during the cycle of rotation of said drive shaft, said gears and crank pin will rotate about relatively stationary axes until said clamp has contacted with the work, whereupon said driven gear will planet about said driving gear swinging said yoke about its axis in opposition to the resistance of said spring until the remote dead center position of said crank pin is reached, when said gear will return to its original position during return movement of said crank pin.

FREDERICK W. SEYBOLD.